United States Patent
Kakemizu et al.

(10) Patent No.: US 7,068,640 B2
(45) Date of Patent: Jun. 27, 2006

(54) VPN SYSTEM IN MOBILE IP NETWORK, AND METHOD OF SETTING VPN

(75) Inventors: Mitsuaki Kakemizu, Kawasaki (JP); Shinya Yamamura, Fukuoka (JP); Yoichiro Igarashi, Kawasaki (JP); Kazunori Murata, Fukuoka (JP); Masaaki Wakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 803 days.

(21) Appl. No.: 09/801,557

(22) Filed: Mar. 8, 2001

(65) Prior Publication Data
US 2002/0018456 A1 Feb. 14, 2002

(30) Foreign Application Priority Data
Jul. 26, 2000 (JP) ............................. 2000-225857

(51) Int. Cl.
*H04L 29/06* (2006.01)
*H04L 12/46* (2006.01)
(52) U.S. Cl. ...................................... 370/349; 370/401
(58) Field of Classification Search ................ 370/310, 370/328, 329, 331, 437, 349, 401; 709/227, 709/228; 455/422.1, 432.1, 433, 435.1
See application file for complete search history.

(56) References Cited

U.S. PATENT DOCUMENTS
6,728,536 B1 * 4/2004 Basilier et al. .......... 455/432.1

FOREIGN PATENT DOCUMENTS
EP 1 124 396 8/2001

OTHER PUBLICATIONS

Perkins, Charlie. "Mobile IP and Security Issue: An Overview". IEEE. 1999. pp. 131-148.*
Glass et al. "Mobile IP Authentication, Authorization, and Accounting Requirements" draft-ietf-mobileip-aa-reqs-00. txt. Oct. 5, 1999. pp. 1-21.*
European Search Report dated Aug. 5, 2004.

(Continued)

*Primary Examiner*—Derrick Ferris
(74) *Attorney, Agent, or Firm*—Katten Muchin Rosenman LLP

(57) ABSTRACT

Linked with a position registration procedure in a mobile IP, the invention provides a VPN setting service using an IP Sec. tunnel between optional terminals without requiring these terminals to have a specific VPN function. This service is provided by a mobile terminal, authentication servers, a VPN database, and network apparatuses. A home authentication server extracts from the VPN database the VPN information of a user who has requested the authentication at the time of making a position registration request from the mobile terminal. The home authentication server then posts the VPN information to each network apparatus using a predetermined position registration message and an authentication response message. Based on the posted VPN information, the network apparatuses set a VPN path by the IP Sec. to between a home network apparatus and an external network apparatus, between the home network apparatus and a predetermined network apparatus, and/or the external network apparatus and the predetermined network apparatus, respectively.

22 Claims, 27 Drawing Sheets

OTHER PUBLICATIONS

Atsushi Inoue, et al. IP Layer Security and Mobility Support Design Policy and an Implementation. XVI World Telecom Congress Proceedings Sep. 21, 1997 pp. 571-577.

Mitsuaki Kakemizu et al. Unified IP Service Control Architecture Based on Mobile Communication Scheme. The Institute of Electronics, Information and Communication Engineers Nov. 1999 pp. 19-24.

Mitsuaki Kakemizu et al. Unified IP Service Control Architecture Based on Mobile Communication Scheme. Fujitsu Scientific and Technical Journal Jun. 2001 pp. 81-86.

Mooi Choo Chuah et al. Mobile Virtual Private Dial-up Services. Bell Labs Technical Journal. Jul.-Sep. 1999 pp. 51-72.

U.S. Appl. No. 09/672,866, Fujitsu Ltd.

* cited by examiner

Fig.5

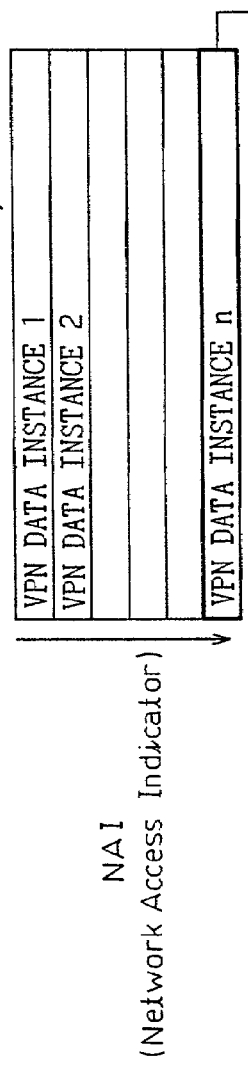

NAI
(Network Access Indicator)

| VPN DATA INSTANCE 1 |
| VPN DATA INSTANCE 2 |
| ... |
| VPN DATA INSTANCE n |

34

| COLUMN NAME | TYPE | REMARKS |
|---|---|---|
| Profile Number | int4 | IDENTIFIER THAT UNIQUELY SHOWS THIS VPN INFORMATION (KEY PARAMETER) |
| Nai | text | NAI OF THIS USER |
| vpnshare | bool | VPN SHARED INDICATOR<br>0: SHARED<br>1: INDIVIDUAL |
| destaddr | text | IP ADDRESS OF COMMUNICATION DESTINATION TERMINAL |
| upclass | int4 | QoS CLASS IN UPWARD DIRECTION |
| downclass | int4 | QoS CLASS IN DOWNWARD DIRECTION |
| upSPI | int4 | UPWARD SPI USED IN IPSec. |
| downSPI | int4 | DOWNWARD SPI USED IN IPSec. |

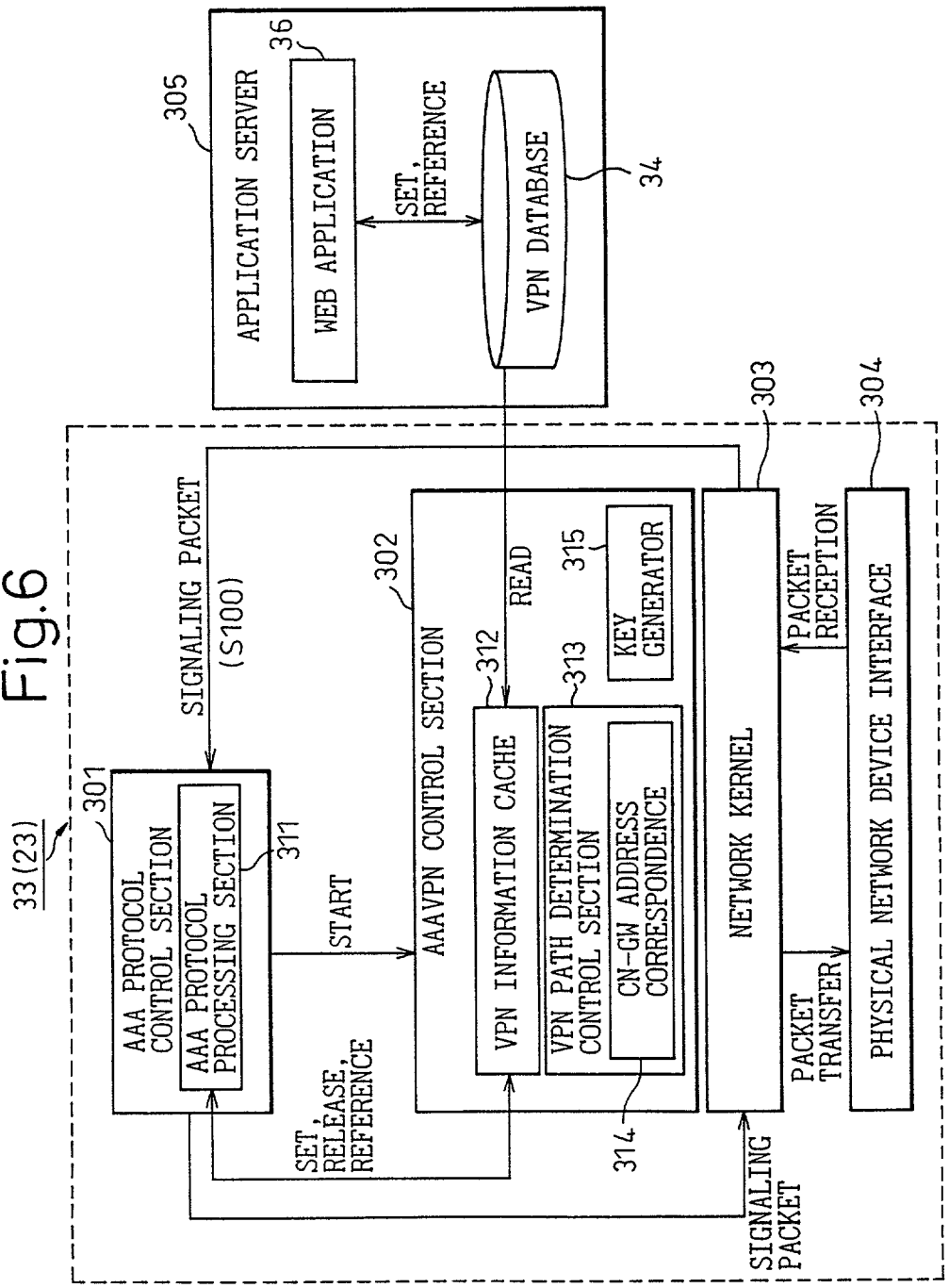

| RECEPTION MESSAGE | PROCESSING AAA | TRANSMISSION MESSAGE |
|---|---|---|
| AMR | AAAF | AMR |
|  | AAAH | HAR |
| AMA | AAAF | AMA |
| HAA | AAAH | AMA |

| RECEPTION MESSAGE | PROCESSING MA | TRANSMISSION MESSAGE |
|---|---|---|
| REGISTRATION REQUEST | FA | REGISTRATION RESPONSE |
|  | HA | BU |
| REGISTRATION RESPONSE | FA | REGISTRATION RESPONSE |
| BU | FA,PCN | BA |
| BA | HA | REGISTRATION RESPONSE |

VPN SYSTEM IN MOBILE IP NETWORK, AND METHOD OF SETTING VPN

BACKGROUND OF THE INVENTION

Field of the Invention

In recent years, along the wide distribution of the Internet, there has been an increase trend that enterprises attempt to decrease their communication costs by replacing their exclusive communication lines with a virtual path (VPN: virtual private network) on the Internet. Reinforcing the security on the Internet is essential in realizing electronic commercial transactions. As a method of realizing this requirement, attention has been focused on the IP Security Protocol (hereinafter to be abbreviated as the IP Sec.).

In the mean time, with the full-scale introduction of IMT-2000 near at hand, the Internet environment has already started to shift toward the mobile environment. The introduction of the mobile environment into the Internet increases the convenience of the users of the Internet. However, this also involves an increasing risk of weakening the security of the Internet. Therefore, there has been a high demand for a provision of a framework that protects security in the mobile environment.

In the IMT-2000, there have also been made many proposals on the system that combines the IP Sec. with the IP Mobility Support (hereinafter to be referred to as the Mobile IP) prescribed in RFC202 that is a basis of the core net architecture. The mobile IP (Mobile Internet Protocol) is a technique for automatically carrying out the IP address management and automatically transferring the communication packet to a move destination of a terminal when the terminal has moved from one IP network to another IP network. An agent function for executing the transfer of an address is provided in a router so that the router can manage both the home address of a terminal as its "registered original address" and a "care-of-address" as a current address of the terminal. When the terminal has moved from one network to another network, the terminal registers a new care-of-address in the router of the network in which the home address exists. Based on a tunneling technique of this arrangement, it becomes possible for this terminal to receive a message sent to the terminal home address from a person who does not know the movements of the terminal.

However, the above proposals are based on the assumption that the end user terminal has the IP Sec. function, as these techniques do not guarantee the complete security on the communication path, that is, between the home agent and the communication terminal. According to the above proposals, all the terminals participating in the communications need to be equipped with the IP Sec. This requirement is not sufficient as a framework to protect the security in the mobile environment. Therefore, there is little meaning in linking the mobile IP with the IP Sec.

DESCRIPTION OF THE RELATED ART

FIG. 1 shows one example of a structure of a network to which the linkage of the mobile IP with the IP Sec., according to the existing proposals, has been applied.

This structure employs both the mobile IP that has been proposed by RFC2002 as the IP architecture for supporting the mobile environment, and the IP Sec. as the architecture for realizing the security on the Internet. From the nature of the mobile IP, it has weak security as compared with the normal network. Therefore, various systems for reinforcing the security are employed including the IP Sec.

In the example shown in FIG. 1, an IP Sec. tunnel 6 substitutes for an IP-IP tunnel set between a mobile agent 21 (a foreign agent, FA) in a network 2 to which a user 1 (MN: Mobile Node) prescribed by the mobile IP has accessed and a mobile agent 31 (a home agent, HA) in a user's home network 3. In this case, it is necessary that VPN information to be used in the IP Sec. is set in advance to the mobile agents 21 and 31 respectively.

A dynamic provision of an IP Sec. tunnel 7 is also included in the above proposals. However, this is a system that depends on an automatic key exchange (IKE) between the mobile terminal 1 and the mobile agents 21 and 31. This system also requires a separate provision of the IP Sec. using an automatic key exchange (IKE) in a communication destination host 52 (CN: Correspondent Node). In this case, it is further necessary to change the mobile IP.

In general, a VPN refers to a virtual path of a user provided in the Internet using the IP Sec., the MPLS, or others. A VPN has no linkage with another Internet technique, for example, a differentiated service by a user unit. As a result, the service quality guarantee of the VPN is carried out based on a sufficient allocation of network resources and a uniform priority control, such as, for example, a simple priority control using a protocol number of the IP Sec. protocol as a filtering condition.

According to the above-describe system, all the terminals participating in the communications need to be provided with the IP Sec. Therefore, there is little meaning in providing the IP Sec. service as the network. Further, there has been a problem that a network service with improved user convenience by freely combining the security service with the service quality guarantee cannot be provided to the terminals including existing terminals not equipped with the IP Sec.

SUMMARY OF THE INVENTION

It is, therefore, an object of the present invention to provide a VPN setting service that enables the communications in the mobile IP to be carried out by using a safe communication path. Linked with a position registration procedure in the mobile IP, it is another object of the present invention to provide a VPN setting service to the communication between optional terminals without requiring the mobile terminals and the communication terminals to have a specific VPN function. This is achieved by dynamically setting a VPN of the IP Sec. to a security gateway, for the terminals participating in communications, connecting to a public IP network. With this arrangement, the VPN service with improved user convenience is provided. As a result, it becomes possible to differentiate service providers that provide the VPN service.

More specifically, the present invention has the following objects.

1) To provide the VPN setting service to between optional terminals without requiring the MN 1 and the CNs 42 and 52 to have a specific VPN function. This service is provided by dynamically setting a VPN of the IP Sec. to the security gateways 21 and 31 of the terminals participating in communications, connecting to the public IP network, linked with a position registration procedure in the mobile IP.

2) To make it possible to set a VPN with the service quality, the security level, and the route, assigned by users based on a free combination.

3) To make it possible to automatically update a VPN path along with a move of the MN 1.

FIG. 2 shows an example of a structure of a network based on the present invention in comparison with the structure shown in FIG. 1. Linked with a position registration procedure in the mobile IP, this provides a VPN setting service to an optional terminal 1 and hosts 32 to 52 having communications. This is achieved by dynamically setting a VPN of the IP Sec. to security gateways 21 to 51 connecting to public IP networks 2 to 5.

FIG. 3 shows an example of a functional block structure of the present invention.

Terms that are used hereinafter will be briefly explained below. MIP (Mobile IP) is the mobile IP protocol prescribed by the RFC2002 in all the future expansions. AAA protocol is a protocol used by the AAA system. In an embodiment of the present invention, the use of DIAMETER protocol currently under examination by the IETF is assumed. The AAA protocol can be implemented in all the protocols capable of transmitting information on authentication, authorization, accounting, and policy. In the transmission of new information that is necessary in the present invention, an expandable attribute parameter called AVP (Attribute Value Pair) defined by the DIAMETER protocol is used. The expanded attribute is the information on the VPN setting.

MN (Mobile Node) indicates a mobile terminal that has the mobile IP protocol function. AAA is a name used by the IETF for servers that carry out the above-described authentication, authorization, and accounting. AAAH is the AAA of a network that has subscriber data of an authentication-requesting user, and AAAF is the AAA of a network that does not have subscriber data of the user. In addition to the above-described functions, the AAA of the present invention has the following functions. The AAA extracts VPN information of an authentication-requesting user from the VPN database. The AAA posts the VPN information to the HA by the HA registration request message. The AAA posts the VPN information to the FA by an authentication response message via the AAAF. The AAA extracts the VPN information by a user unit. Further, the AAA determines a VPN path.

FA (Foreign Agent) is a functional entity defined by the RFC2002, and is an agent not owning a home address allocated to a mobile terminal. The FA decapsulates an encapsulated packet transmitted to a care-of-address that is an address of the own node, and transfers the decapsulated packet to a link layer address corresponding to the home address. A table called a visitor list manages this address correspondence. The FA of the present invention has both the security gateway function of the IP Sec. and the edge router function of a differentiated service.

HA (Home Agent) is a functional entity defined by the RFC2002, and is an agent owning a home address allocated to a mobile terminal. A packet transferred to the HA with a home address of a mobile terminal as a transmission destination is encapsulated and transmitted to a care-of-address of the FA corresponding to the home address. A table called a mobility binding manages this address correspondence. The HA of the present invention has both the security gateway function of the IP Sec. and the edge router function of a differentiated service.

PCN (Proxy Correspondent Node) is a functional entity prescribed in Japanese Patent No. 2000-32372. On behalf of a communication node (CN: Correspondent Node) that does not support the mobile IP under the management, the PCN receives a Binding update message transmitted to this CN from the HA. The PCN then sets a binding tunnel to a destination posted by the Binding update message. The PCN of the present invention has both the security gateway function of the IP Sec. and the edge router function of a differentiated service. The PCN analyzes the VPN information posted by the MIP protocol, and sets a differentiated service to the network kernel and sets a tunnel at the assigned security level based on the analyzed VPN information.

According to the present invention, the user authentication server and network apparatuses constitute the IP network that supports the mobile environment. When there has been an initial position registration request (an authentication request) from the terminal 1, the authentication server (AAAH) extracts the VPN information of the user who has requested the authentication, from the VPN database. The authentication server then posts this VPN information to the network apparatuses (HA, FA) using the position registration message and the authentication response message. The network apparatuses (HA, FA) set a VPN between the HA and the FA based on the posted VPN information. When the communication destination terminal CN exists in other network 4, the network apparatus (HA) further sets a VPN to the security gateway (PCN) accommodating the communication destination terminal assigned by the VPN information from the HA.

Further, the authentication server and the network apparatuses update the VPN information cached to the authentication server and the network apparatuses linked to the position registration request based on the move of the mobile terminal 1, into new path information. The authentication server and the network apparatuses further rewrite the VPN information based on the position information posted by the mobile IP. As a result, a new IP Sec. tunnel is set dynamically between the new FA and the HA and between the PCN and the new FA, and the VPN path is automatically updated. Further, in order to make complete the security protection in the data packet transfer to the FA, the IP Sec. tunnel is also set in the binding tunnel to the FA at the time of a smooth-hand-off.

The authentication server (AAAH) of the present invention has a VPN database for storing the service quality desired by the user, the security information between the security gateways, and a correspondence table between the VPN information by a user unit consisting of the IP addresses of the communication destination hosts (CN) for setting a VPN and the security gateway (VPNGW) for accommodating the communication destination host, an AAAVPN control section for specifying a VPN setting path based on a security gateway (FA) address of the access network 2 to which the mobile terminal set in the authentication request message has been connected, a security gateway address (HA) of the home network 3 of the mobile terminal, and a security gateway (PCN: Proxy CN) address for accommodating the communication destination host (CN) set in the user correspondence VPN information and the communication destination host extracted from the correspondence table, and an AAA protocol processing section for setting the service quality and the security information between the security gateways as a service profile, to the authentication response message to the access network and the position-registration message to the home network.

Further, the network apparatuses (HA, FA, PCN) consisting of the security gateways of the present invention have an MA (Mobility Agent) protocol processing section for understanding the service profile file set with the VPN information, the RFC2002 and other relevant expansion protocols, and an MAVPN control section for setting the QoS control for guaranteeing the service quality according to the posted service profile and a tunnel for guaranteeing the security between the security gateways.

The MA protocol processing section in PCN also carries out a protocol processing of receiving, on behalf of the CN not supporting the mobile IP under the management, a Binding update message sent from the HA to this CN, and setting, on behalf of the CN, the binding tunnel to the FA by using the IP Sec. tunnel, based on the service profile set with the VPN information posted by the Binding update message.

When the security protection has been requested by the service profile at the time of setting the tunnel, the MAVPN control section of the network apparatus (HA) in the home network 3 of the mobile terminal (MN) 1 sets the IP Sec. tunnel in place of the normal IP-IP tunnel as the tunnel directed from the HA prescribed by the RFC2002 to the network apparatus (FA) in the external network 2 that is the current connection point of the mobile terminal. In the mean time, when the security protection has been requested by the service profile, the MAVPN control section at the FA side sets the IP Sec tunnel in place of the IP-IP tunnel as the tunnel (usually called a reverse tunnel) from the FA to the HA.

As described above, according to the present invention, linked with the position registration procedure in the mobile IP, a VPN using the IP Sec. can be set dynamically to the security gateways of the terminals participating in communications, connecting to the public IP network. Therefore, it is possible to provide the VPN setting service between optional mobile terminals (MN) and communication destination hosts (CN) without requiring the terminals and the hosts to have a specific VPN function. Further, as the VPN setting service can be provided at the network side, the users can assign service quality, a security level, and a path based on a free combination of these items by the users.

BRIEF DESCRIPTION OF THE DRAWINGS

The present invention will be more clearly understood from the description as set forth below with reference to the accompanying drawings.

FIG. 5 is a diagram showing an example of a structure of a VPN database.

FIG. 6 is a diagram showing an example of a detailed functional block structure of the AAA.

DETAILED DESCRIPTION OF THE PREFERRED EMBODIMENTS

Figure 4:
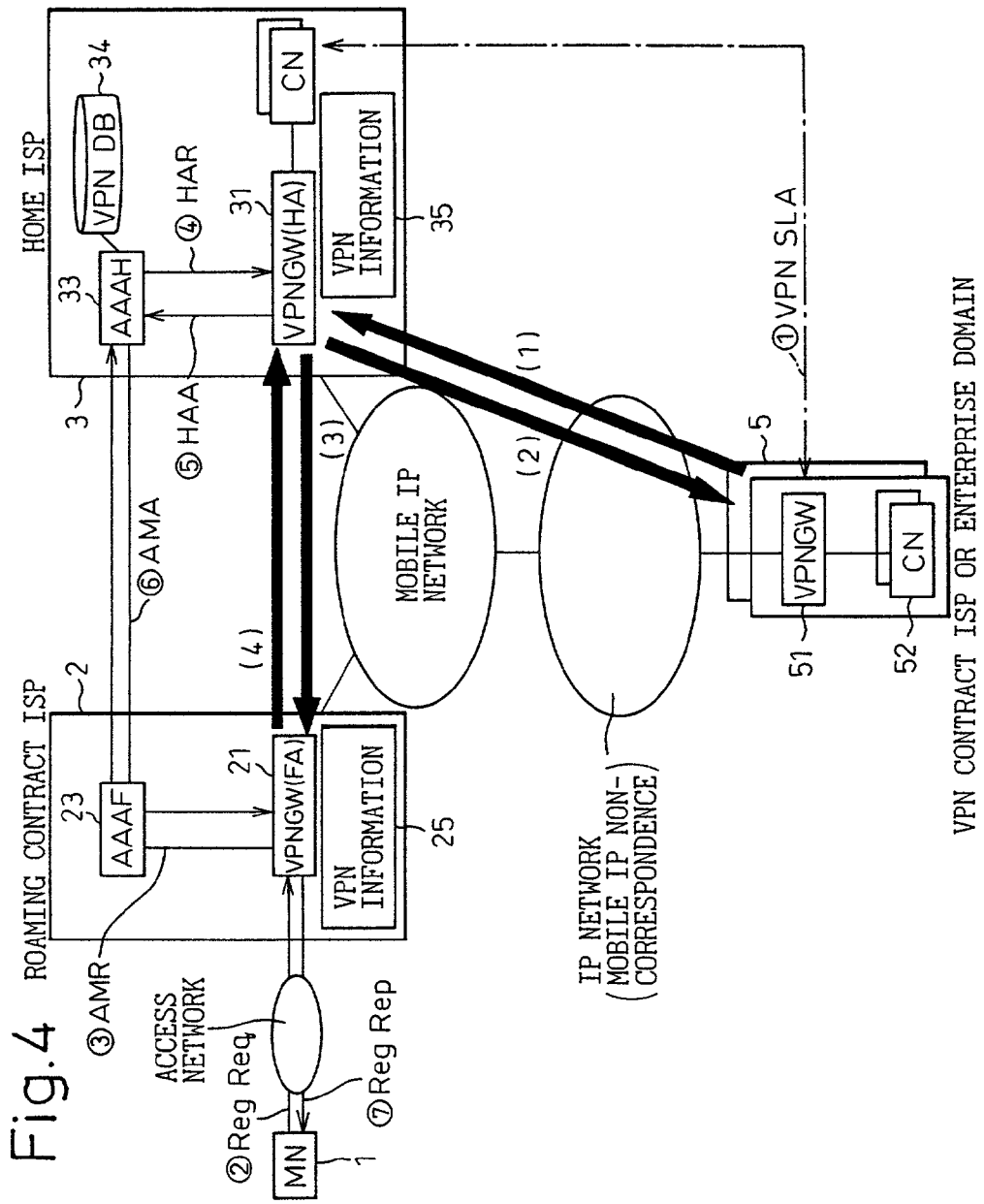
FIG. 4 is a diagram showing a first embodiment of the present invention.

FIG. 4 shows a first embodiment of the present invention.

This shows an example of a setting of a VPN (when a VPN exists between a stationary HA and a CN) at the time of an initial position registration. This assumes a case where a certain user has made a contract with an ISP (Internet Service Provider) providing a VPN service that the user can receive an automatic VPN setting service when the user makes access to the user's company through a public network. To facilitate the understanding of the present invention, a further detailed structure and operation of each functional block of the present invention shown in FIG. 3 will be explained below where necessary in the explanation of the present embodiment.

In FIG. 4, a user 1 who wants the above service first makes a VPN contract (SLA: Service Level Agreement) with an enterprise 5 and a home ISP 3 (①). The contract covers an SPI (Security Parameter Index) and keys to be used, the service quality, and a list of users that can utilize this VPN. Based on this SLA, the enterprise sets VPN information of a HA 31 of the ISP3 to a VPNGW apparatus 51 of the own enterprise. The ISP sets a domain address of this enterprise, SPI and the keys to a VPN database of the user indicated to the enterprise. Further, the ISP registers the domain address of the enterprise and the address of the VPNGW apparatus 51 in a CN-GW correspondence table as VPN information 35, and also sets the inability of dynamic setting of a VPN to a GW type.

FIG. 5 shows an example of a structure of the VPN database used in the present invention.

A VPN database 34 is a set of VPN data instances 1 to n that have been set by users. Each instance corresponds to one VPN. Each VPN data instance consists of a Profile Number that is an identifier for uniquely expressing this VPN information, a Network Access Identifier of the user (NAI), a VPN share indicator (vpnshare) that expresses whether a security relationship shared between the security gateways is to be used or a user own security relationship is to be used, an IP address of a communication destination terminal (destaddr), a QoS class in an upward direction (upclass), a QoS in a downward direction (downclass), an upward SPI to be used by the IP Sec. (upSPI), and a downward SPI to be used by the IP Sec. (downSPI).

Figure 8:
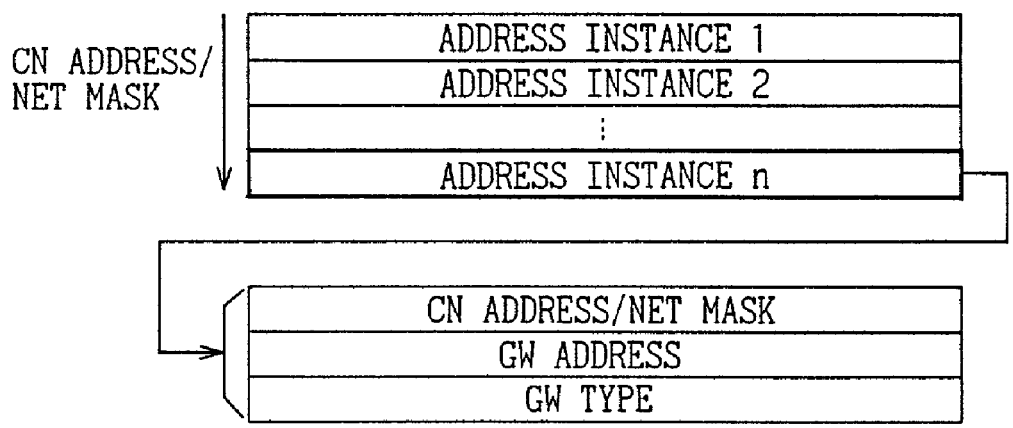
FIG. 8 is a diagram showing a CN-GW address correspondence table.

When zero (0) has been set to the VPN share indicator, it is possible to omit the upclass, the downclass, the upSPI, and the downSPI. This database is searched using the user NAI, and all the searched instances are recorded and added with the address information into a VPN information cache to be described later. The database search protocol used for searching data depends on the product of the database that packages the VPN database. Usually, the LDAP (Light Directory Access Protocol) and the SQL are used. FIG. 8 to be described later shows the CN-GW correspondence table of the VPN information 35.

Next, the user 1 connects to an optional access point of an ISP 2 that has a roaming contract with the home ISP 3 with whom the enterprise has contracted, and the user 1 transmits a position registration request (Reg Req) of the mobile IP (②). As a result, the user 1 can utilize the network. FA21, that becomes a connection point of the ISP 2 having the roaming contract, includes this registration request in an authentication request message (AMR) (③), and transmits this authentication request message to AAA (AAAH) 33 of the home ISP 3 of the user via an AAA sever (AAAF) 23 within the own ISP.

The AAAH searches the VPN database 34 by the NAI included in the authentication request message (AMR), and extracts the VPN information 35 own to this user. From the CN-GW address correspondence table, it can be known that it is not possible to dynamically set a VPN to the domain address of the enterprise assigned as the communication destination in the VPN database. Therefore, the AAAH sets two VPNs including a VPN between the FA and the HA and a VPN between the HA and the enterprise GW to a VPN information cache to be described later. Next, the AAAH transmits a position registration request message (HAR) added with the profiles of the two VPNs, to the HA (④).

FIG. 6 shows an example of detailed functional blocks of the AAA, and FIG. 7 to FIG. 12 show examples of their operation.

Figure 1:
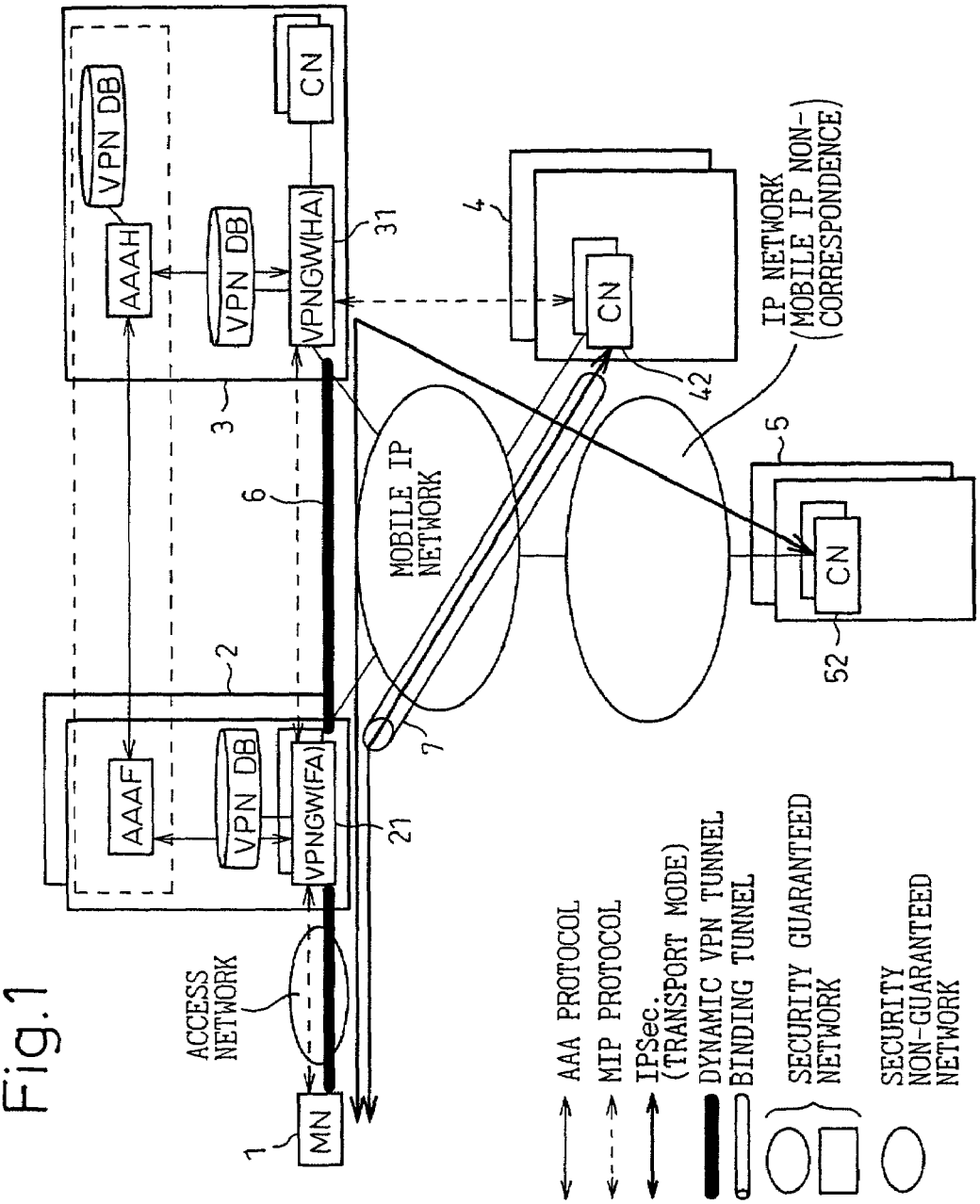
FIG. 1 is a diagram showing an example of an application of the mobile IP plus the IP Sec. according to existing proposals.
Figure 2:
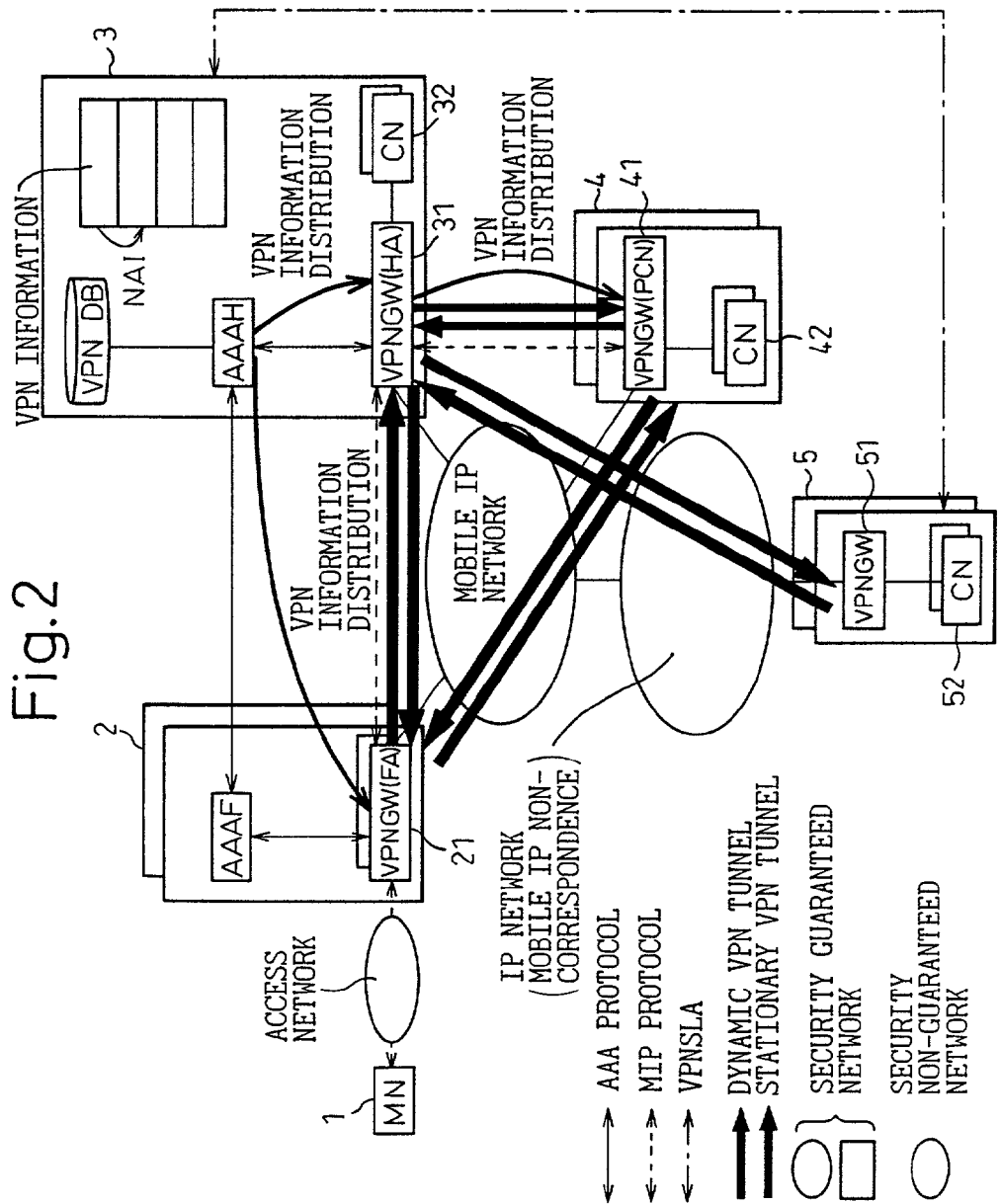
FIG. 2 is a diagram showing an example of a structure of a network according to the present invention.
Figure 3:
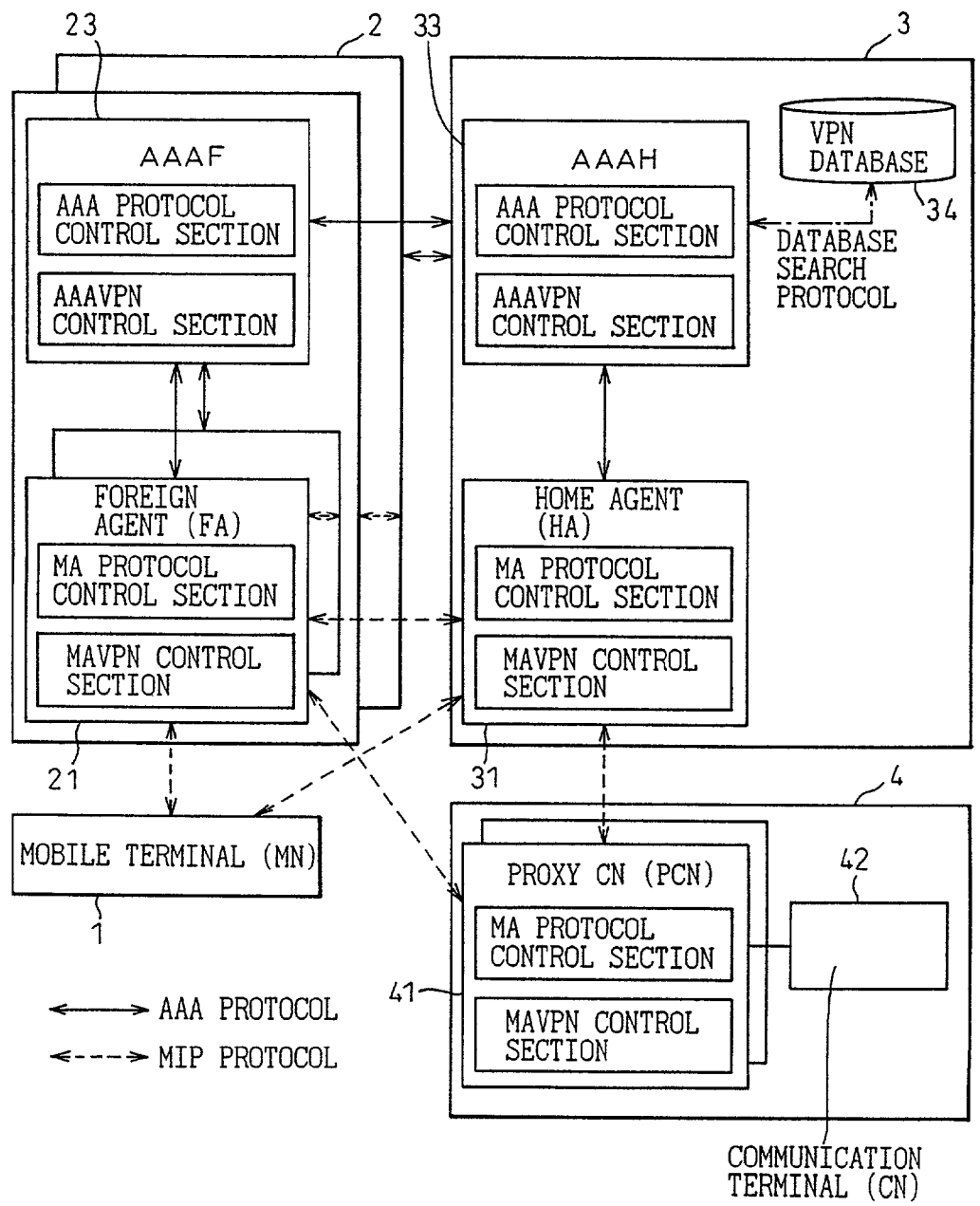
FIG. 3 is a diagram showing an example of a functional block structure relating to the present invention.

In FIG. 6, AAA 33 (and AAA 23) consists of an application server 305, a network kernel 303, and physical network device interface 304, in addition to the AAA protocol control section 301, and the AAAVPN control section 302, both shown in FIG. 3. The AAA protocol control section 302 consists of an AAA protocol processing section 311 for controlling the AAA protocol.

Figure 7:
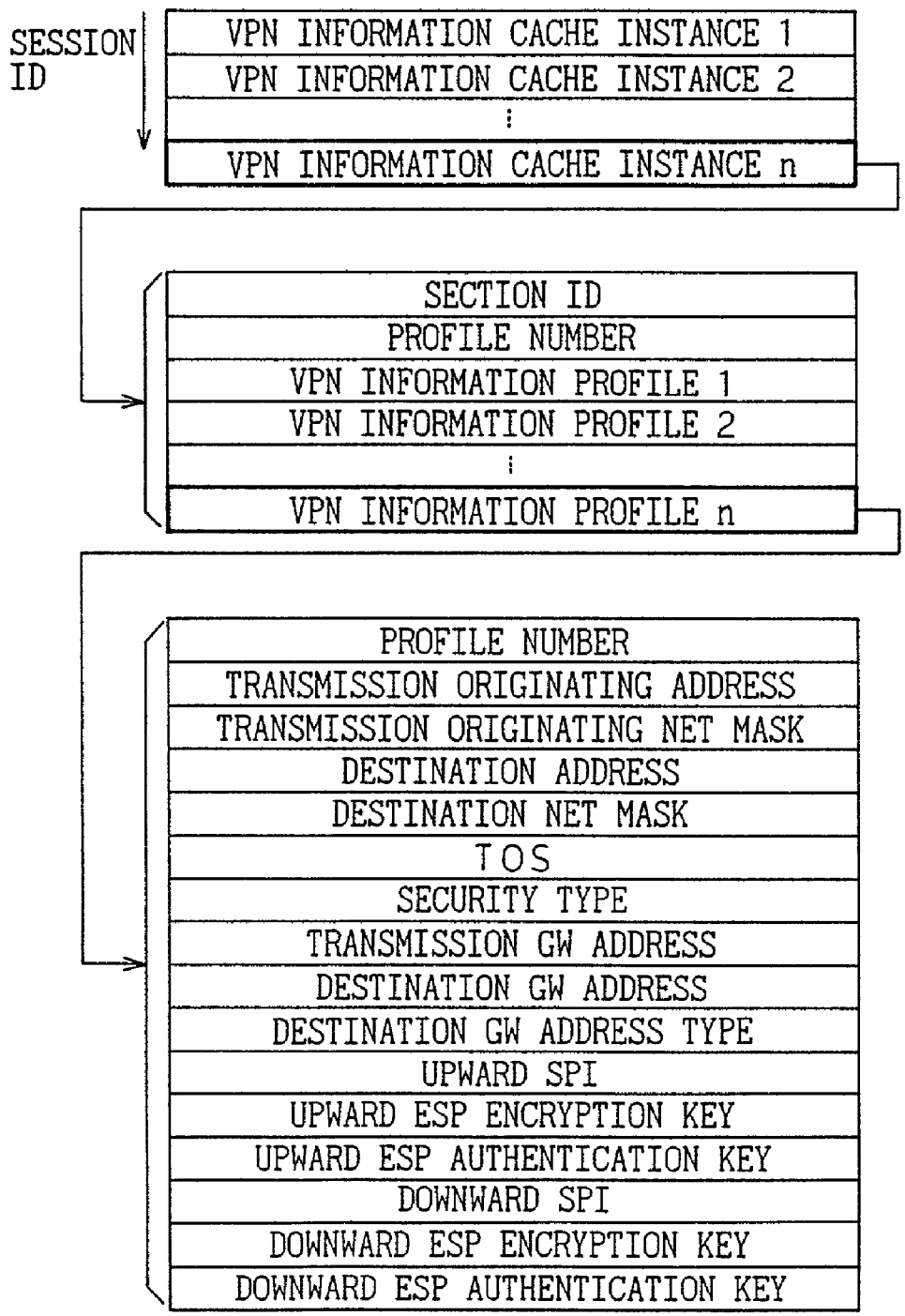
FIG. 7 is a diagram showing an example of a structure of a VPN information cache.

The AAAVPN control section 302 consists of a VPN information cache 312 for caching the VPN information extracted from the VPN database (shown in FIG. 5), a VPN path determination control section 313, and a key generator 315. FIG. 7 shows an example of the VPN information cache 312. The VPN information cache 312 is a set of VPN information cache instances 1 to n. The VPN information cache 312 is searched by using a session ID that includes unique user own information in a network effective while a user is making access to the network. Each of the VPN information cache instances 1 to n consists of a session ID as a unique identifier, a profile number that shows a number of VPNs set by the user, and VPN information profiles 1 to n that include set information of each VPN.

Each of the VPN information profiles 1 to n consists of a profile number as an identifier for uniquely identifying a VPN, an IP address of a transmitter and an IP address of a destination for specifying a packet to which a VPN is applied, a transmitter net mask and a destination net mask, a TOS value to be set to the packet, a security type for showing whether the IP Sec. is to be set by the AH, the ESP or by only encapsulation, a transmitter gateway address and a destination gateway address that are an entrance and an exist of the IP Sec. tunnel referred to by the IP Sec. tunnel mode, a destination gateway address type for showing whether a VPN can be set dynamically to the destination gateway or not, an upward SPI (Security Parameter Index) and a downward SPI as identifiers of the security, an upward ESP encryption key and a downward ESP encryption key, and an upward authentication key and a downward authentication key.

The VPN path determination control section 313 has a CN-GW address correspondence table 314. FIG. 8 shows an example of the CN-GW address correspondence table. The CN-GW address correspondence table consists of address instances 1 to n, each including a CN address/net mask, a GW address, and a GW type. This table is searched using the CN address/net mask (an enterprise domain address) as a key.

The application server consists of a VPN database 34, and a WEB application 36. The network kernel 303 is an operating system for controlling a transfer to the IP packet and a physical interface as a connection point to the network. The physical network device interface 304 is an interface (a hardware control driver) to a physical network device, and is usually a NIC card of a LAN.

FIG. 9 to FIG. 13 show examples of a processing flow of the AAA.

Figure 9:
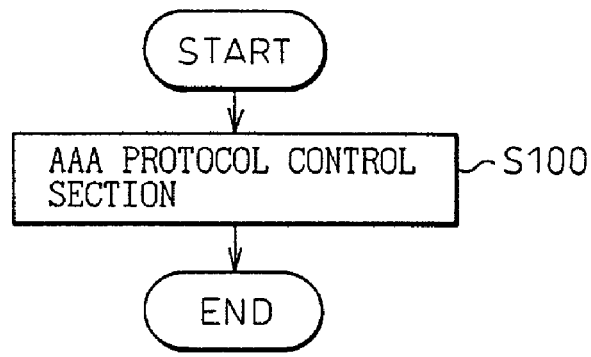
FIG. 9 is a diagram showing an example of a total processing flow of the AAA.
Figures 10, 11:
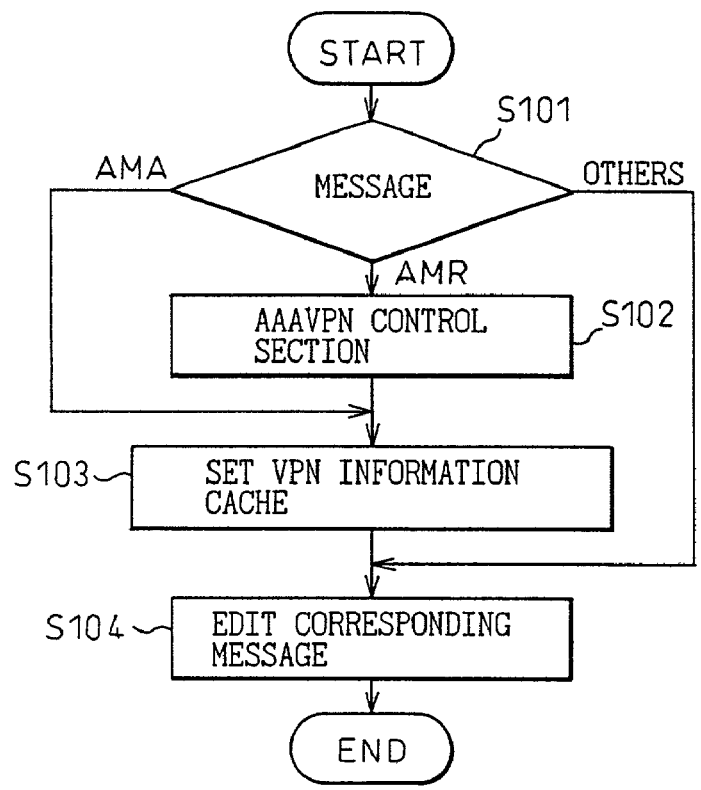
FIG. 10 is a diagram showing an example of a processing flow of an AAA protocol processing section.
FIG. 11 is a diagram showing a message correspondence table in FIG. 10.

FIG. 9 shows an example of a total processing of the AAA. When the network kernel 303 has received a packet from the physical network interface 304, the network kernel 303 selects an AAA signaling packet based on a port number, and delivers the information of the received packet to the AAA protocol control section 301 (S100). FIG. 10 shows an example of a processing flow of the AAA protocol processing section 311. First, the AAA protocol processing section 311 makes a decision on the received message based on a command code AVP (an attribute parameter) of the received AAA protocol (S101). When the message is the authentication request message (AMR), the process proceeds to step S102. When the message is an authentication response message (AMA) to be described later, the process proceeds to step S103. When the message is other message, the process proceeds to step S104.

In the present example, the AAAVPN control section 302 is started (S102). Next, the AAA protocol processing section 311 sets the VPN information extracted from the VPN database 34 to the VPN information cache (S103). Then, the AAA protocol processing section 311 edits the corresponding message according to the CN-GW correspondence table, for example, sets a differentiated service, and transmits a result (S104). A profile cache AVP to the effect that the VPN information cache has been set is set to the authentication response message (AMA) and the position registration request message (HAR) that are transmitted by the AAAH 33. FIG. 11 shows a message correspondence table (a relationship among a transmission message, a reception message, and a processing unit of these messages) at step S104 shown in FIG. 10.

Figure 12:
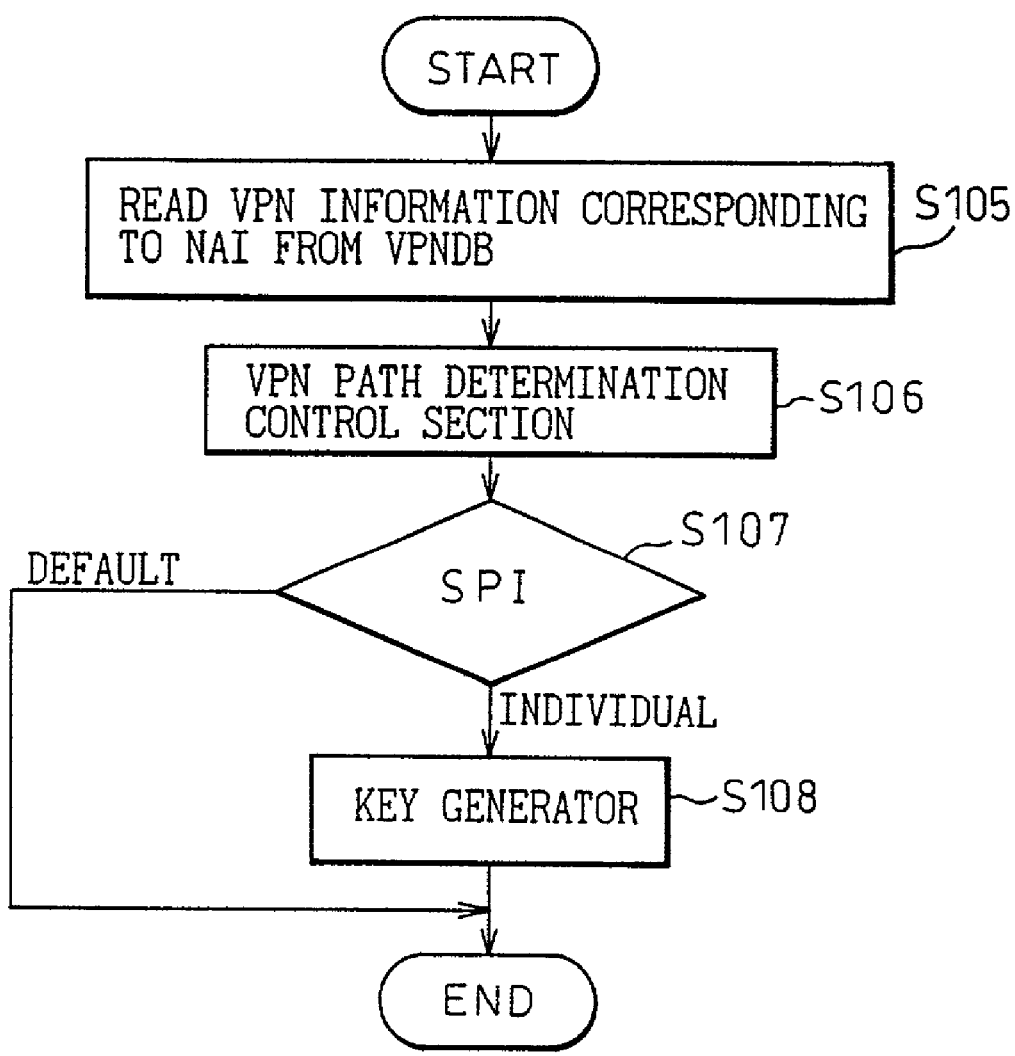
FIG. 12 is a diagram showing an example of a processing flow of an AAAVPN control section.

FIG. 12 shows an example of a processing flow of the AAAVPN control section 302. First, the AAAVPN control section 302 searches the VPN database 34 by the NAI of the mobile terminal, and reads the corresponding VPN information (S105). Next, the AAAVPN control section 302 starts the VPN path determination control section 313 (S106). When the SPI (Security Parameter Index) read from the VPN database 34 is a default SPI, the AAAVPN control section 302 finishes the processing. When the SPI read from the VPN database 34 is not a default SPI, the AAAVPN control section 302 generates a separate key with the key generator 315 (S108).

Figure 13:
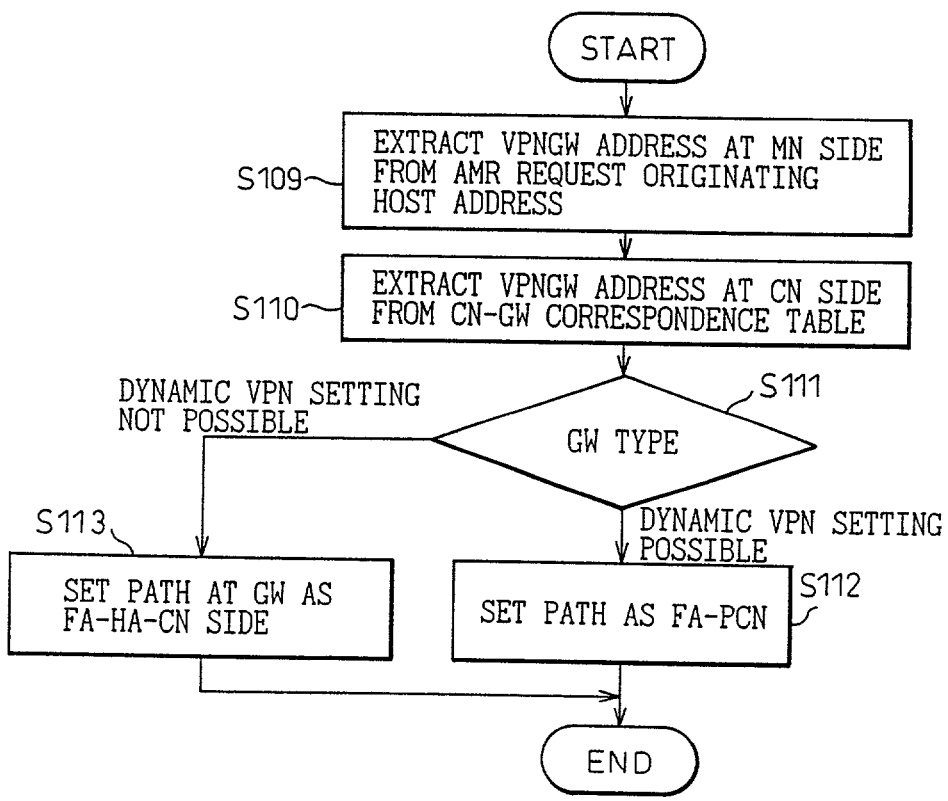
FIG. 13 is a diagram showing an example of a processing flow of a VPN path determination control section.

FIG. 13 shows an example of a processing flow of the VPN path determination control section 313. The VPN path determination control section 313 extracts the address of the VPNGW (FA) 21 at the MN 1 side from the request originating host address of the authentication request message (AMR) (S109). Further, the VPN path determination control section 313 searches the CN-GW address correspondence table 314 by the CN address read from the VPN database 34, and reads the address of the VPNGW 51 at the CN 52 side and the VPNGW type (S110).

Next, when the VPNGW type is the one to which a VPN can be set dynamically, the process proceeds to step S112. When the VPNGW type is the one to which a VPN cannot be set dynamically, the process proceeds to step S113. In the present example, the processing at step S113 is carried out. The VPN path determination control section 313 sets the address of the HA 31 to the transmission originating GW address of the VPN information posted to the HA 31, and sets the address of the GW 51 read from the CN-GW address correspondence table 314 to the destination GW address. Further, the VPN path determination control section 313 sets the address of the FA 21 to the transmission originating GW address of the VPN information to be posted to the FA 21, and sets the address of the HA 31 to the destination GW address HA 31. Then, the VPN path determination control section 313 finishes the processing (sets a path to the FA, the HA and the CN).

In the mean time, when the VPNGW type is the one to which a VPN can be set dynamically, the VPN path determination control section 313 sets the address of the FA 21 to the destination GW address of the VPN information posted to the HA 31, and sets the address of the GW 51 read from the CN-GW address correspondence table 314 to the destination GW address. Further, the VPN path determination control section 313 sets the address of the FA 21 to the transmission originating GW address of the VPN information to be posted to the FA 21, and sets the address of the GW 51 read from the CN-GW address correspondence table to the destination GW address. Then, the VPN path determination control section 313 finishes the processing (sets a path to between the FA and the CN (or the PCN)).

Referring back to FIG. 4, the HA 31 caches the VPN information added to the position registration request message (HAR) that has been received from the AAAH 33, and further maps an assigned differentiated service. Thereafter, the HA 31 sets an IP Sec. tunnel (2) from the HA 31 to the enterprise GW 51, and sets an IP Sec. tunnel (3) from the HA 31 to the FA 21, based on the path information received. Further, the HA 31 sets the information for decoding a packet of an opposite-direction tunnel to an IP Sec. information table to be described later. As the IP Sec. tunnel (1) from the GW 51 at the enterprise side to the HA 31 has already been fixed based on the initial contract setting (SLA), it is not necessary to set this IP Sec. tunnel (1) from the HA 31 to the enterprise GW 51. The HA 31 transmits the position registration response message (HAA) to the AAAH 33 after finishing the position registration processing (⑤).

When the AAAH 33 has received the position registration response message (HAA), the AAAH 33 extracts a VPN between the FA and the HA from the VPN information cache 312 (see S113 in FIG. 13). The AAAH 33 then transmits to the AAAF 23 an authentication response message (AMA) added with the VPN profile to be set to the FA 21 (⑥). The AAAF 23 caches the VPN information to within the AAAF 23 to follow the move within the local domain of the MN 1, and transfers this VPN information to the FA 21 (reference S101, S103 and S104 in FIG. 10).

The FA 21 caches the VPN information added to the authentication response message (AMA), and further maps an assigned differentiated service. Thereafter, the FA 21 sets an IP Sec. tunnel (4) from the FA 21 to the HA 31. Further, the FA 21 sets the information for decoding a packet of an opposite-direction tunnel to the IP Sec. information table. Last, the FA 21 returns the registration response message (Reg Rep) to the MN 1 (⑦). As a result, the VPNs from the access point of the MN 1 to the GW 51 of the enterprise have been set. Further, as a packet of a user who has not been assigned by the enterprise is not transferred via the IP Sec. tunnel, it is possible to prevent an unauthorized user from making an illegal access to the enterprise. It is also possible to avoid making a troublesome contract with a plurality of ISPs and SLAs.

Figure 14:
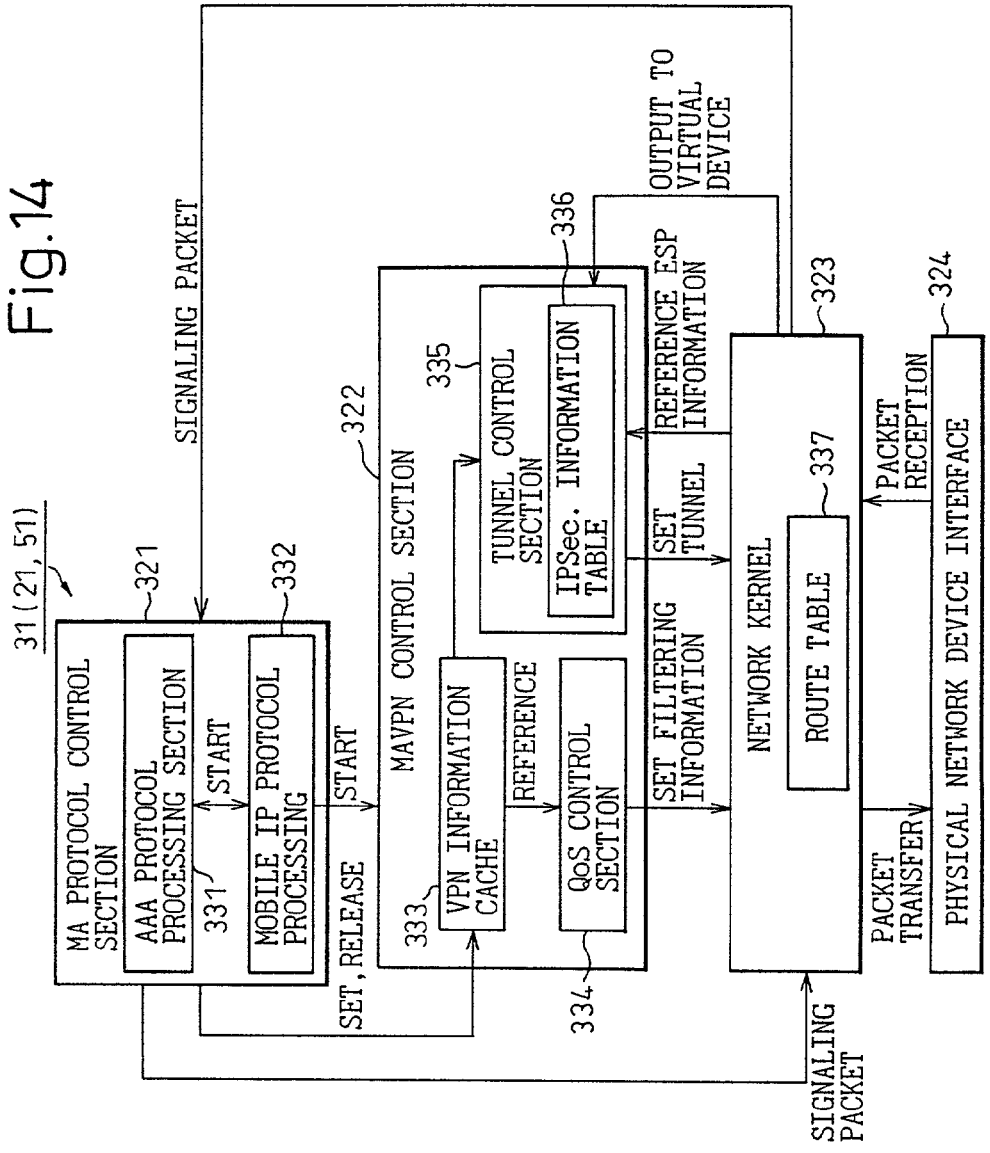
FIG. 14 is a diagram showing an example of a detailed functional block structure of the MA (FA, HA, PCN).

FIG. 14 shows detailed functional blocks of the MA (FA, HA, PCN), and FIG. 15 to FIG. 24 show examples of operations.

In FIG. 14, each network apparatus of the FA, the HA and the PCN consists of an MA protocol control section 321, an MAVPN control section 322, a network kernel 323, and a physical network device interface 324. The MA protocol control section 321 consists of an AAA protocol processing section 331 for controlling the AAA protocol, and a mobile IP protocol processing section 332 for controlling the mobile IP. The MAVPN control section 322 consists of a VPN information cache 333 for caching the VPN information posted by the AAA or the MIP protocol, a QoS control section 334, and a tunnel control section 335.

The VPN information cache 333 has a similar structure to that explained with reference to FIG. 7. The QoS control section 334 sets to the network kernel 323 filter, information consisting of a TOS value set to the VPN information cache 333, a transmission originating address and a destination address for identifying a packet that marks the TOS value, and their net masks. The tunnel control section 335 rewrites an output device of a route table 337 to a virtual device in a destination IP address that has been set in the VPN information cache 333. Further, the tunnel control section 335 sets to an IP Sec. information table 336, a transmission originating IP address and a destination IP address, their net masks, a security type, a transmission originating gateway address and a destination gateway address, an upward SPI and a downward SPI as identifiers of the security, an upward ESP encryption key and a downward ESP encryption key, and an ESP authentication key. The tunnel control section 335 encrypts and encapsulates a packet output from the network kernel 323 to the virtual device, by referring to the IP Sec. information table 336.

Figure 15:
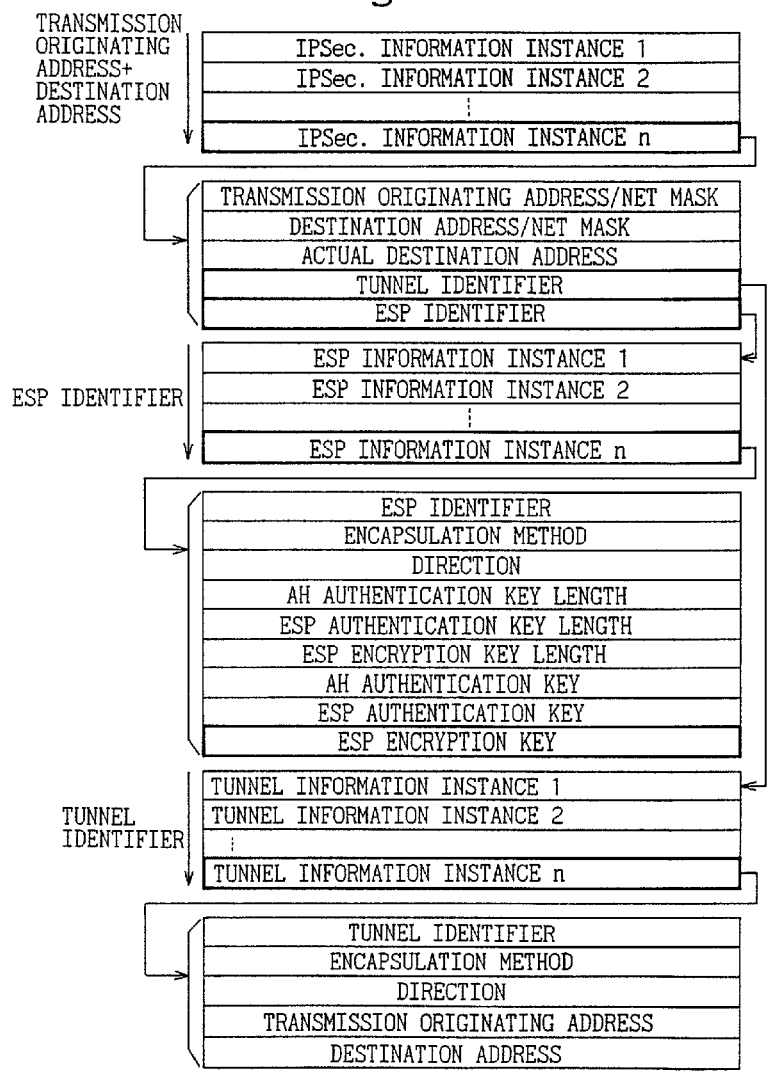
FIG. 15 is a diagram showing an example of a structure of an IP Sec. information table.

FIG. 15 shows an example of the IP Sec. information table 333. The IP Sec. information table consists of IP Sec. information, ESP information, and tunnel information. The IP Sec. information is a collection of IP Sec. information instances, and is specified by a set of a transmission originating address and a destination address. Each IP Sec. information instance consists of a transmission originating address/net mask, a destination address/net mask, an actual destination address as an actual transfer destination of a packet, a tunnel information identifier to be applied to this packet, and an ESP information identifier to be applied to this packet. The ESP information is a collection of ESP information instances. This ESP information consists of an ESP identifier for uniquely identifying ESP information, an encryption method, a direction, an AH authentication key length, an ESP authentication key length, an ESP encryption key length, an AH authentication key, an ESP authentication key, and an ESP encryption key. The tunnel information is a collection of tunnel information instances. The tunnel information consists of a tunnel identifier for uniquely identifying tunnel information, an encapsulation method, a direction, and a transmission originating address and a destination address that become an entrance and an exit of a tunnel.

The network kernel 323 is an operating system for controlling a transfer of an IP packet and a physical interface as a connection point to the network, and has a routing table 337 for determining a transfer route of the IP packet. The network kernel 323 carries out the encapsulation of the IP packet, the packet editing, and the control of packet transmission queue. These functions depend on the operating system, and therefore, they will not be explained in the present invention.

Figure 16:
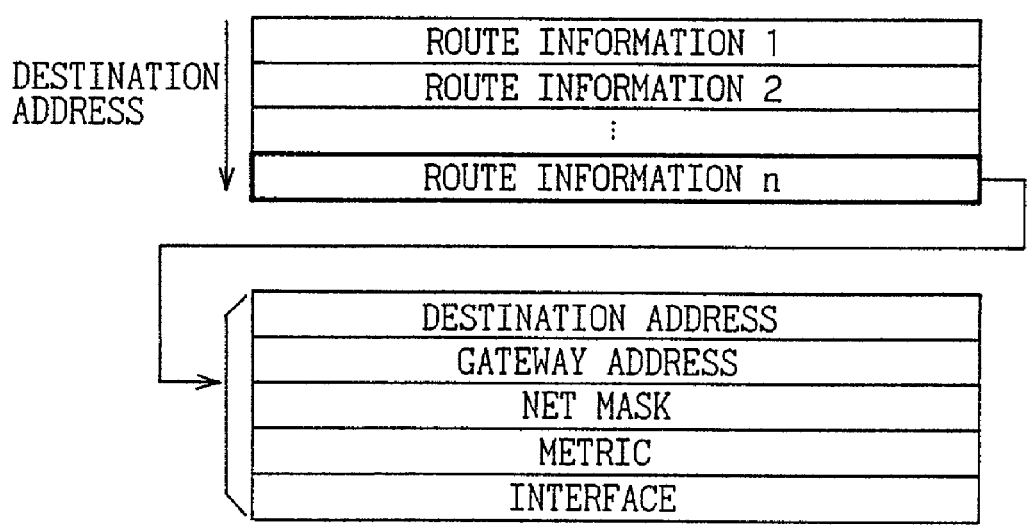
FIG. 16 is a diagram showing an example of a structure of a route table.

FIG. 16 shows an example of the routing table 337. The general routing table consists of a destination address, a gateway address, a net mask, a metric, an exit interface, and other control auxiliary information. A route is determined based on the destination address and the metric. In the present invention, a network kernel that does not depend on a structure of the route table but can set a virtual device to an output destination will be explained in detail below. The network kernel has a function of decapsulating an encapsulated packet upon receiving this packet. When a packet after the decapsulation includes the ESP header, the network kernel has a function of decoding the encrypted packet by referring to the ESP information held in the tunnel control section 335. The physical network device interface 324 is an interface (a hard control driver) to a physical network device. The physical network device is a package or an NIC card of, for example, a LAN, an ISDN, an ATM, etc.

FIG. 17 to FIG. 24 show examples of a processing flow of the MA. The MA processing according to the present invention will be explained below with reference to these examples of the processing flow.

Figure 17:
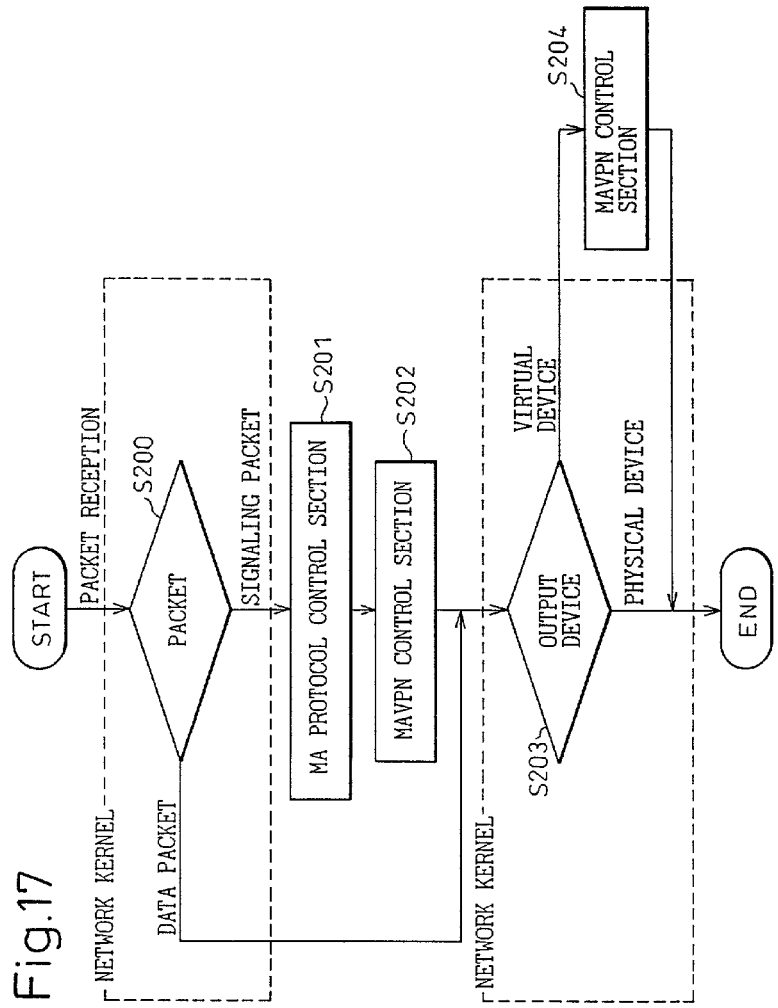
FIG. 17 is a diagram showing an example of a total processing flow of the MA.

FIG. 17 shows a total processing flow of the MA. Upon receiving a packet from the physical network interface 324, the network kernel 323 decapsulates and decodes the encrypted packet as briefly explained above, and then discriminates the received packet between a signaling packet and a data packet (S200). The selection of a signaling packet is determined based on whether the packet has been received by a port number assigned by the MA protocol control section 321 or not. When the received packet is a signaling packet, the process proceeds to step S201, and when the received packet is not a signaling packet, the process proceeds to step S203.

When the received packet is a signaling packet, the network interface 324 delivers the information of the received packet to the MA protocol control section 321, and then the MA protocol control section 321 carries out the AAA protocol processing 331 and the mobile IP protocol processing 332 (S201). Next, the MAVPN control section 322 is started to carry out the VPN information (S202). At step S203, the network kernel 323 determines the interface to the output destination of the received packet by referring to the routing table 337. The network kernel 323 edits the packet according to a filtering condition of a differentiated service set in advance in the kernel. When the output destination is a virtual device, the process branches to step S204. When the output destination is a physical device, the packet is transferred to this device.

At step S204, the network kernel 323 delivers the information of the transferred packet to the MAVPN control section 322, and the MAVPN control section 322 carries out a tunneling and encryption of the packet based on the information set in advance. In the case of encapsulating the IP packet by the tunneling processing, the MAVPN control section 322 carries over the TOS information of the original packet. The IP packet that has been edited is returned to the network kernel 323 again. Then, the network kernel 323 transfers the packet to a corresponding physical device by referring to the routing table 337 based on a given new destination of the IP packet.

Figure 18:
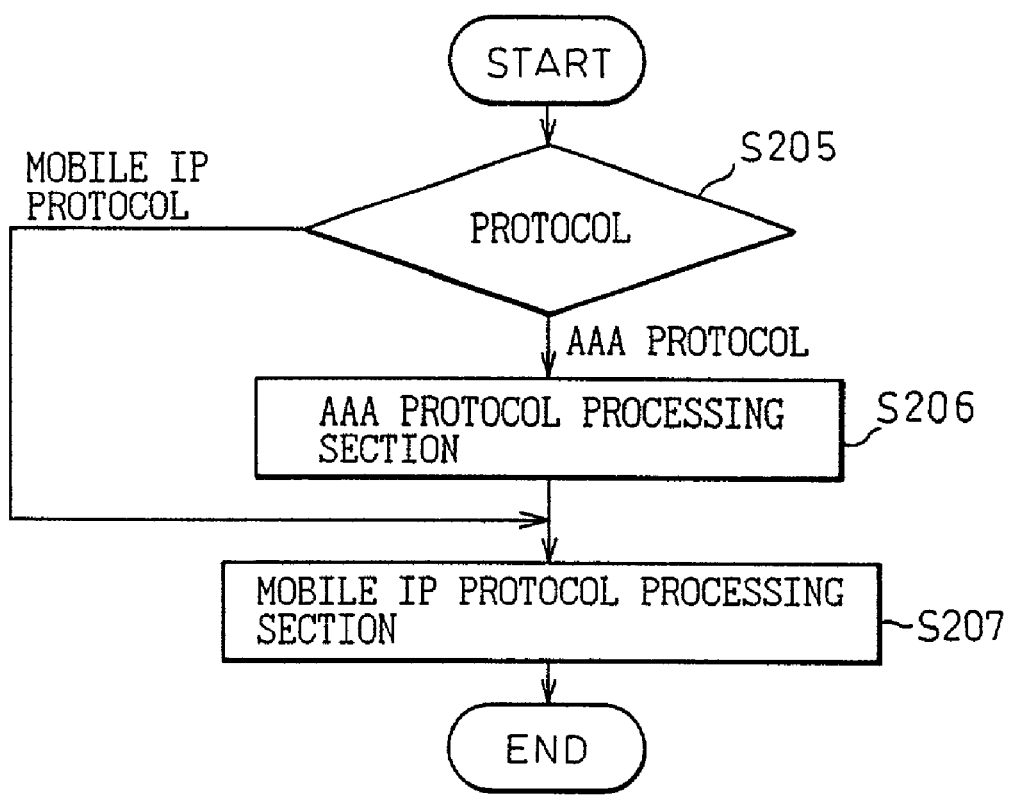
FIG. 18 is a diagram showing an example of a processing flow of an MA protocol processing section.

FIG. 18 shows an example of a processing flow of the MA protocol control section 321. First, the MA protocol control section 321 checks a port number of a received packet. When this port number is a port number of the AAA protocol, the process proceeds to step S206. When this port number is a port number of the mobile IP protocol, the process proceeds to step S207 (S205). At step S206, the MA protocol control section 321 starts the AAA protocol processing section 331 to process the AAA protocol (reference FIG. 19). Thereafter, the MA protocol control section 321 extracts the mobile IP protocol added to the AAA protocol as a part of the information, and delivers the processing to step S207. At step S207, the MA protocol control section 321 starts the mobile IP protocol processing section 332, and then finishes the processing.

Figure 19:
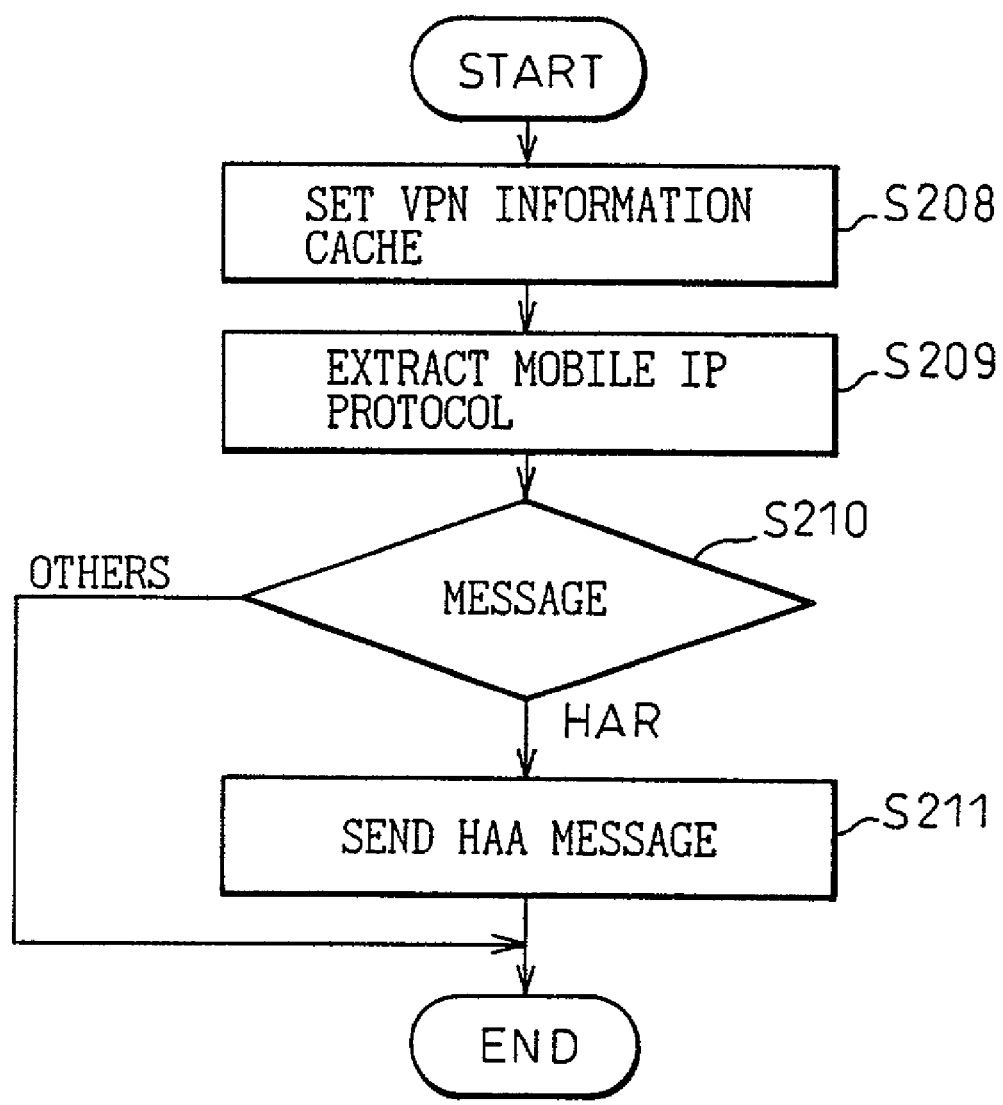
FIG. 19 is a diagram showing an example of a processing flow of an AAA protocol processing section.

FIG. 19 shows an example of a processing flow of the AAA protocol processing section 331. First, the AAA protocol processing section 331 extracts the VPN information from a received AAA protocol, and then delivers this VPN information to the VPN information cache 333. Next, the AAA protocol processing section 331 sets a flag on a shared memory to indicate that the cache has been set and updated, for the mobile IP protocol processing section 332 to refer to this fact (S208). After finishing the AAA protocol processing, the AAA protocol processing section 331 extracts the mobile IP protocol added to the AAA protocol as a part of the information (S209). When the received message is a position registration request message (HAR), the AAA protocol processing section 331 transmits a position registration response message (HAA) (S210 and S211).

Figure 20:
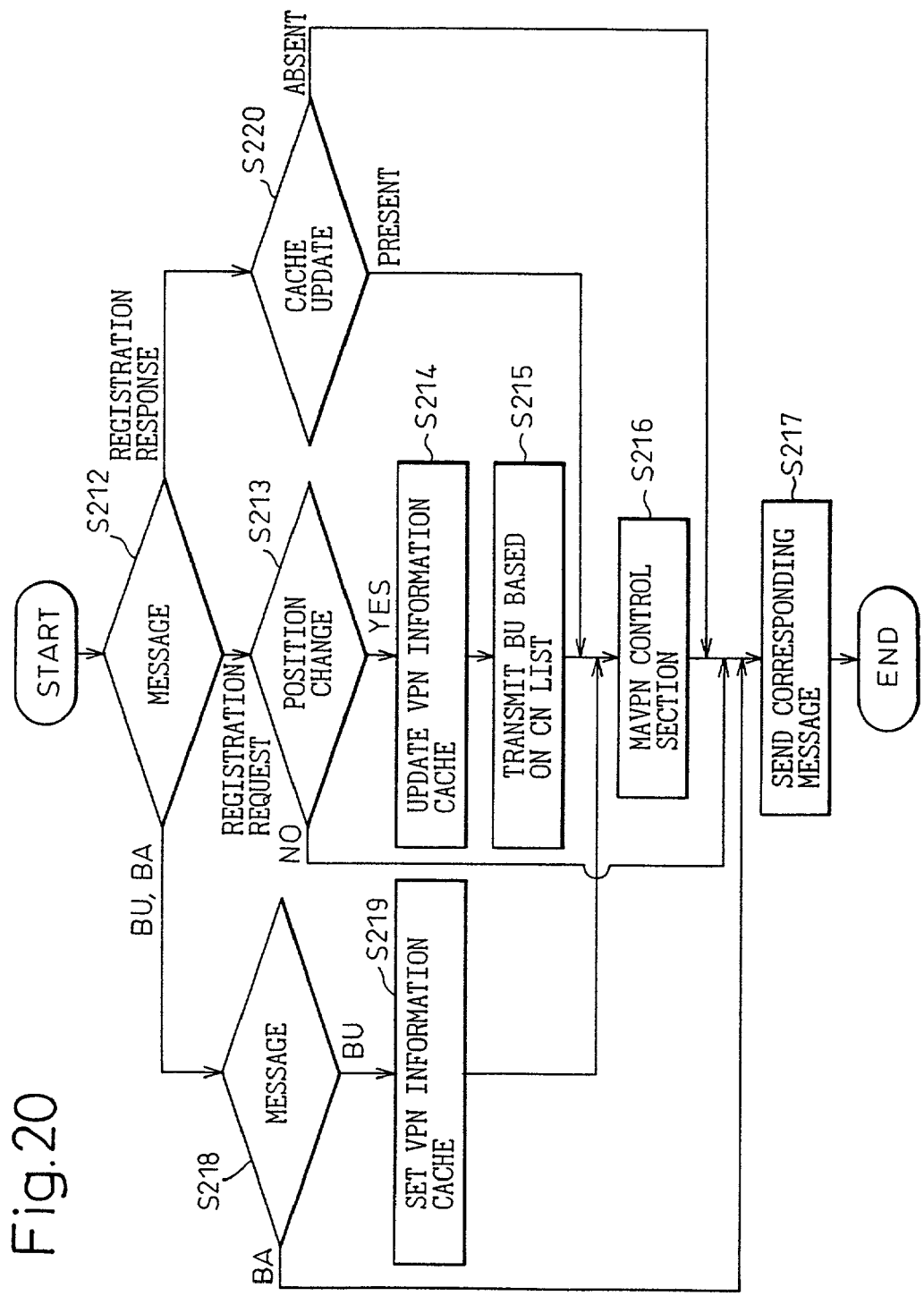
FIG. 20 is a diagram showing an example of a processing flow of a mobile IP protocol processing section.

FIG. 20 shows an example of a processing flow of the mobile IP protocol processing section 332. At step S212, the mobile IP protocol processing section 332 makes a decision on the type of a received mobile IP protocol message. When the type of the received mobile IP protocol message is a registration request, the process proceeds to step S213. When the type of the received mobile IP protocol message is a registration response, the process proceeds to step S220. When the type of the received mobile IP protocol message is a BU (Binding Update) or a BA (Binding Acknowledge), the process proceeds to step S218.

A. In the Case of the Registration Request

When the MA that has received the registration request is the HA, the mobile IP protocol processing section 332 compares the care-of-address of the registration request message with the old care-of-address within the mobility binding. When these care-of-addresses do not coincide with each other as a result of the comparison, the process proceeds to step S214. When these care-of-addresses coincide with each other as a result of the comparison or when the MA that has received the registration request is the FA, the process branches to step S217 (S213). At step S214, the mobile IP protocol processing section 332 specifies the VPN information cache instance of the MN that has transmitted the position registration message, and rewrites the destination GW address of the VPN information cache 333 to the address posted by the care-of-address.

This specification method can be achieved by providing an IP address of the MN to the session ID, or by providing a link between the mobility binding and the VPN information cache instance. The HA searches all the VPN information profiles set in the specified VPN information cache instance. When the destination GW type is one to which a dynamic VPN can be set, the HA edits the BU message that has set the VPN information to the transmission originating address of this profile, and transmits this edited BU message (S215). At step S216, the mobile IP protocol processing section 332 starts the MAVPN control section 322, and edits the reception message and the message specified by the processing MA as shown in a message correspondence table in FIG. 21, and transmits the edited result (S217).

B. In the Case of the Registration Response

At step S220, the mobile IP protocol processing section 332 refers to the cache update information set in advance in the shared memory by the AAA protocol processing section 331. When there has been an updating in the cache, the process branches to step S216. When there has been no updating in the cache, the process branches to step S217.

C. In the Case of the BU or BA

At step S218, when the received message is the BU, the process branches to step S219, and when the received message is the BA, the process branches to step S217. When the processing MA is the PCN, the mobile IP protocol processing section 332 receives all the BU messages addressed to the CN under the management of the PCN, on behalf of the CN. This system can be achieved by, for example, the method disclosed in Japanese Patent No. 2000-32372. When the processing MA is the PCN, the mobile IP protocol processing section 332 sets the VPN information set in the BU message to the VPN information cache 333, or substitutes the message with this VPN information. When the processing MA is the FA, the mobile IP protocol processing section 332 updates the destination GW address of the VPN information cache 333 to a new FA address (S219).

Figures 21, 22:
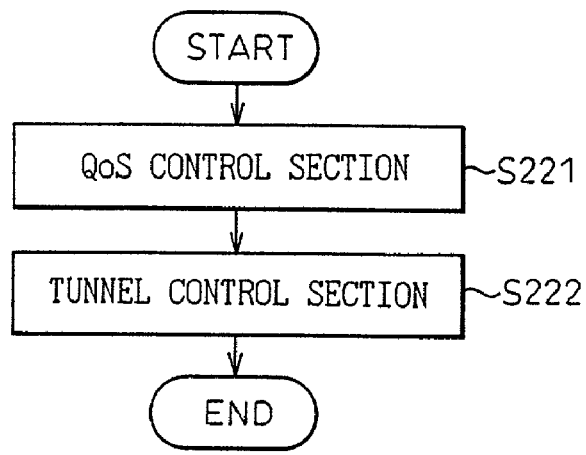
FIG. 21 is a diagram showing a message correspondence table in FIG. 20.
FIG. 22 is a diagram showing an example of a processing flow of an MAVPN control section.

FIG. 22 shows an example of a processing flow of the MAVPN control section 322. The MAVPN control section 322 starts the QoS control section 334 at step S221, and starts the tunnel control section 335 at the next step S222.

Figure 23:
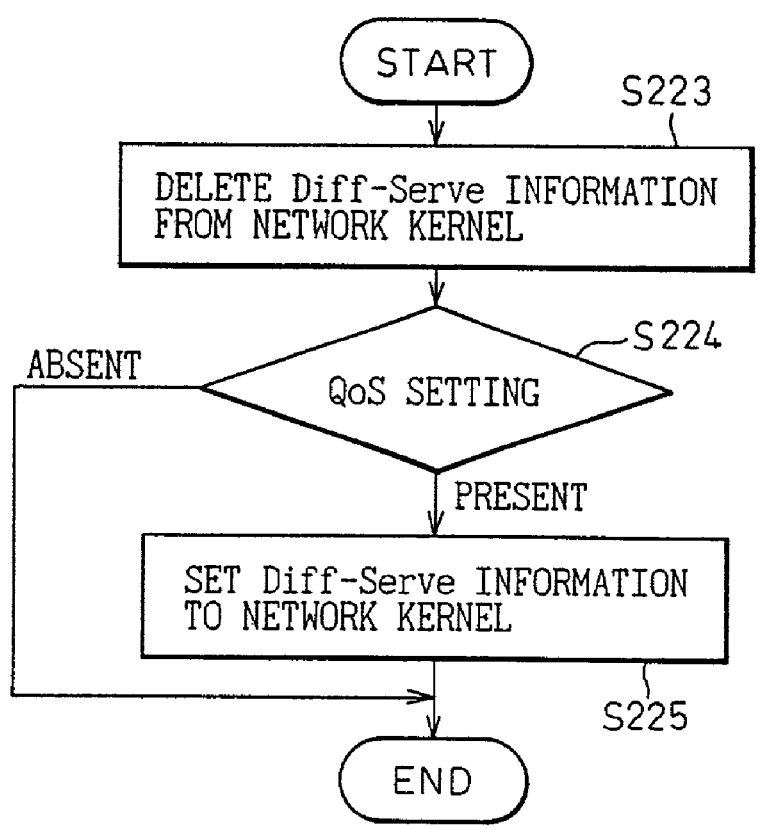
FIG. 23 is a diagram showing an example of a processing flow of a QoS control section.

FIG. 23 shows an example of a processing flow of the QoS control section 334. First, at step S223, the QoS control section 334 deletes the information of the differentiated service that has been set to the network kernel 323 based on the information of the VPN information instance. Next, when the TOS value of the VPN information instance is other than zero (0), the QoS control section 334 branches the process to step S225. When the TOS value of the VPN information instance is not other than zero (0), the QoS control section 334 finishes the processing (S224). At step S225, the QoS control section 334 sets the information of the differentiated service to the network kernel based on the information of the VPN information instance (S225).

Figure 24:
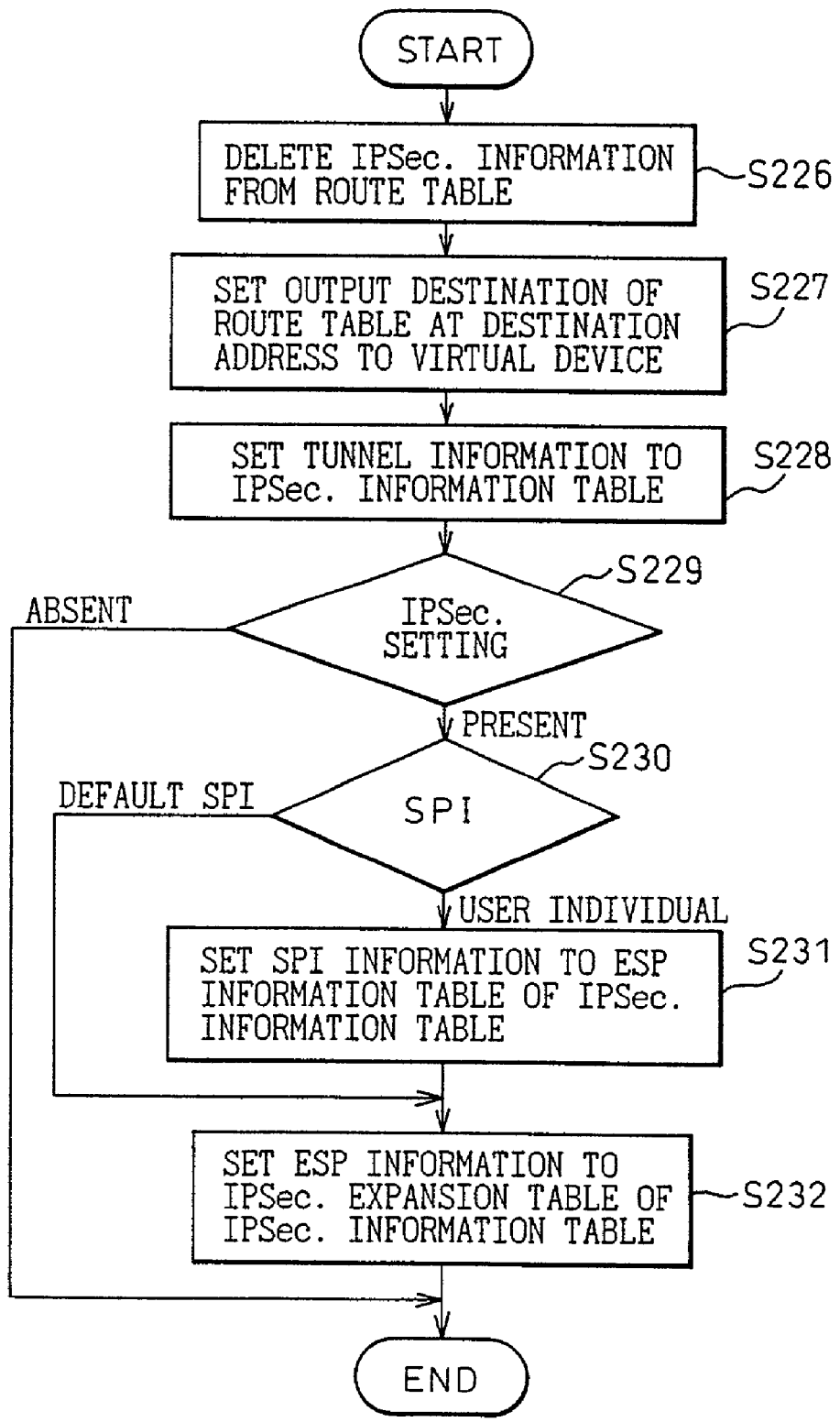
FIG. 24 is a diagram showing an example of a processing flow of a tunnel control section.

FIG. 24 shows an example of a processing flow of the tunnel control section. First, the tunnel control section deletes the information in the route table 337 that has been set to the network kernel 323 and the corresponding information in the information table 336 based on the information of the VPN information instance (S226). Next, the tunnel control section sets the output destination of the route table at the destination address set in the VPN information profile of the VPN information instance to a virtual device (S227). Further, the tunnel control section sets the tunnel information instance of the IP Sec. information table 336 by referring to the VPN information profile of the VPN information instance (S228).

At step S229, the tunnel control section refers to the security type within the VPN information profile of the VPN information instance. When the ESP or the AH has been assigned, the process branches to step S230. When the ESP or the AH has not been assigned, the tunnel control section finishes the processing. At step S230, the tunnel control section refers to the SPI within the VPN information profile of the VPN information instance. When the SPI is a user individual SPI, the process proceeds to step S231. When the SPI is a default SPI, the process proceeds to step S232. It is assumed that this default SPI has been set to MA in advance at the time of the initial structuring or from a local maintenance console of the MA. At step S231, the tunnel control section sets the key information relevant to the SPI of the VPN information profile of the VPN information instance to the ESP information instance. At step S232, the tunnel control section sets the ESP identifier to the IP Sec. information instance.

Various other embodiments of the present invention separate from the above-described first embodiment will be explained below in order to further enhance the understanding of the operation of the present invention, based on the items described above.

Figure 25:
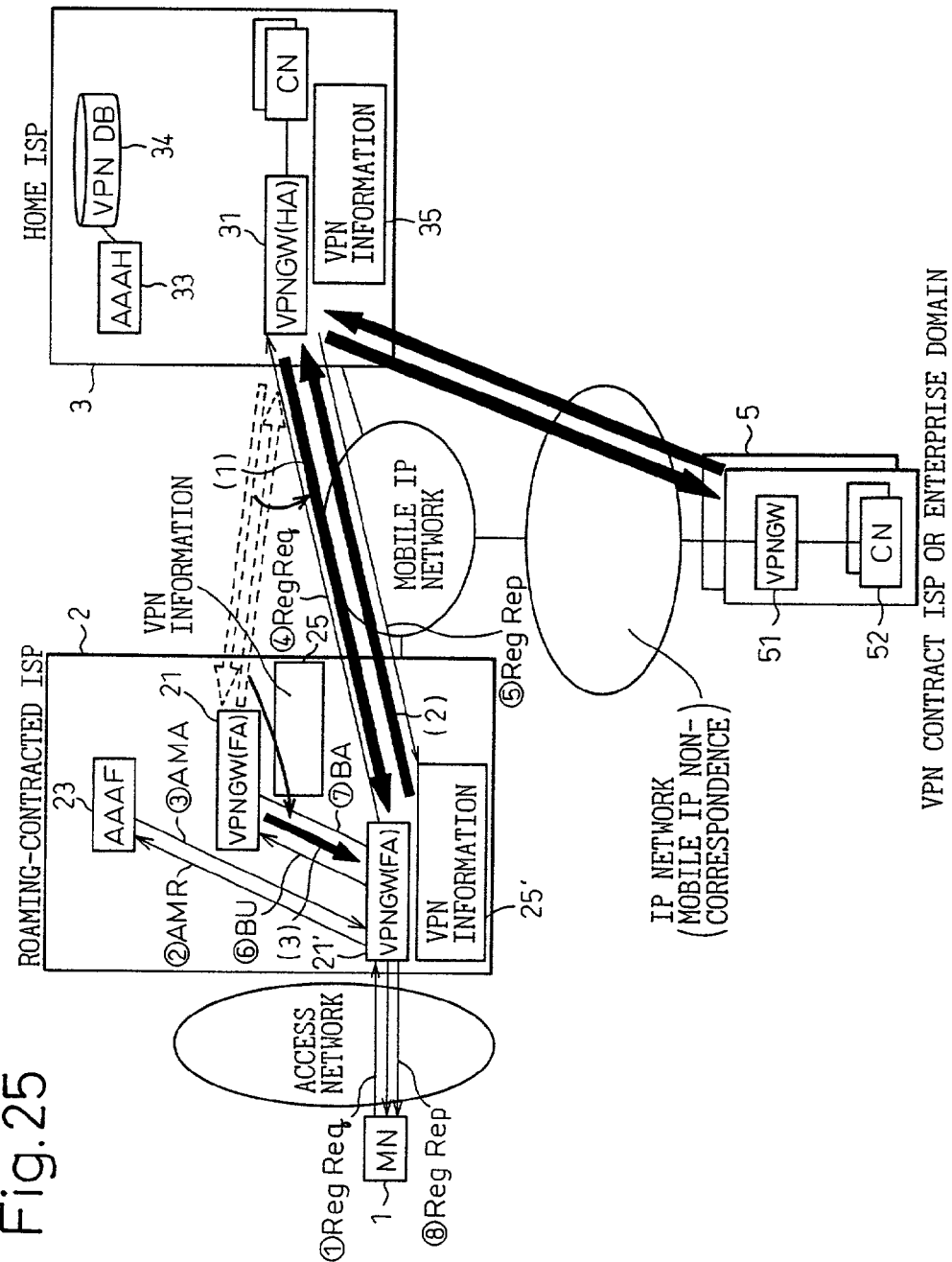
FIG. 25 is a diagram showing a second embodiment.

FIG. 25 shows a second embodiment of the present invention.

This shows an example of a setting of a VPN (when a VPN exists between a stationary HA and a CN) at the time of a move within the same domain. This schematically shows how a VPN is reconstructed when the MN 1 of a user has moved from the FA 21 of the roaming-contracted ISP 2 of the first embodiment to other FA 21' of the same roaming-contracted ISP 2 after a VPN has been set to the GW 51 of the enterprise domain.

In FIG. 25, when the MN 1 of the user has moved from the FA 21 to a new FA 21' within the same domain, a registration request message (Reg Req) that includes the address of the old FA 21 is transmitted as prescribed in the mobile IP path optimization draft (draft-ietf-mobileip-optim-09) (①). The new FA 21' includes this registration request into an authentication request message (AMR) (②), and transmits this authentication request message (AMR) to the local AAA server (AAAF) 23 within its own ISP 2. When the authentication request message (AMR) includes the old FA 21, the AAAF 23 extracts the VPN between the FA and the HA from the VPN information cache, and substitutes the address of the FA 21 with the address of the new FA 21'. Then, the AAAF 23 returns to the new FA 21' an authentication response message (AMA) that is added with a profile of the VPN to be set to the FA (③).

The FA 21' transfers the registration request message (Reg Req) received from the MN 1 to the HA 31 (④). The HA 31 specifies a VPN profile from the HA to the FA from the VPN information cache, and rewrites the address of the FA to the address of the new FA 21'. Next, the HA 31 deletes the IP Sec. tunnel to the old FA 21, and sets a new IP Sec. tunnel (①) to the new FA 21'. The HA 31 finishes a position registration processing, and then returns the registration response message (Reg Rep) to the FA 21' (⑤).

The FA 21' maps an assigned differentiated service by referring to the VPN information cache, and then sets an IP Sec. tunnel (2) from the FA 21' to the HA 31. The FA 21' then sets the information for decoding a packet of an opposite-direction tunnel to the IP Sec. information table. Further, the FA 21' copies the VPN information cache, and rewrites the transmission originating GW address to the address of the old FA 21 and rewrites the destination GW address to the address of the new FA 21'. Thereafter, the FA 21' adds this VPN information to the BU message, and transmits this message to the old FA 21 (⑥).

The old FA 21 caches the VPN information added to the BU message, deletes the IP Sec. tunnel directed from the FA 21 to the HA 31, and maps an assigned differentiated service. Thereafter, the FA 21 sets an IP Sec. tunnel (3) at the smooth-hand-off time from the old FA 21 to the new FA 21'. As a result, all the packets addressed to the MN 1 and received by the old FA 21 before the changeover of the IP Sec. to the new IP Sec. tunnel (1) tunnel by the HA 31 are transferred to the new FA 21' via this IP Sec. tunnel (3). The old FA 21 returns the BA message to the MN after completing the setting of the IP Sec. tunnel (3) (⑦). Based on this, the new FA 21' returns the registration response message (Reg Rep) to the MN 1 (⑧).

Figure 26:
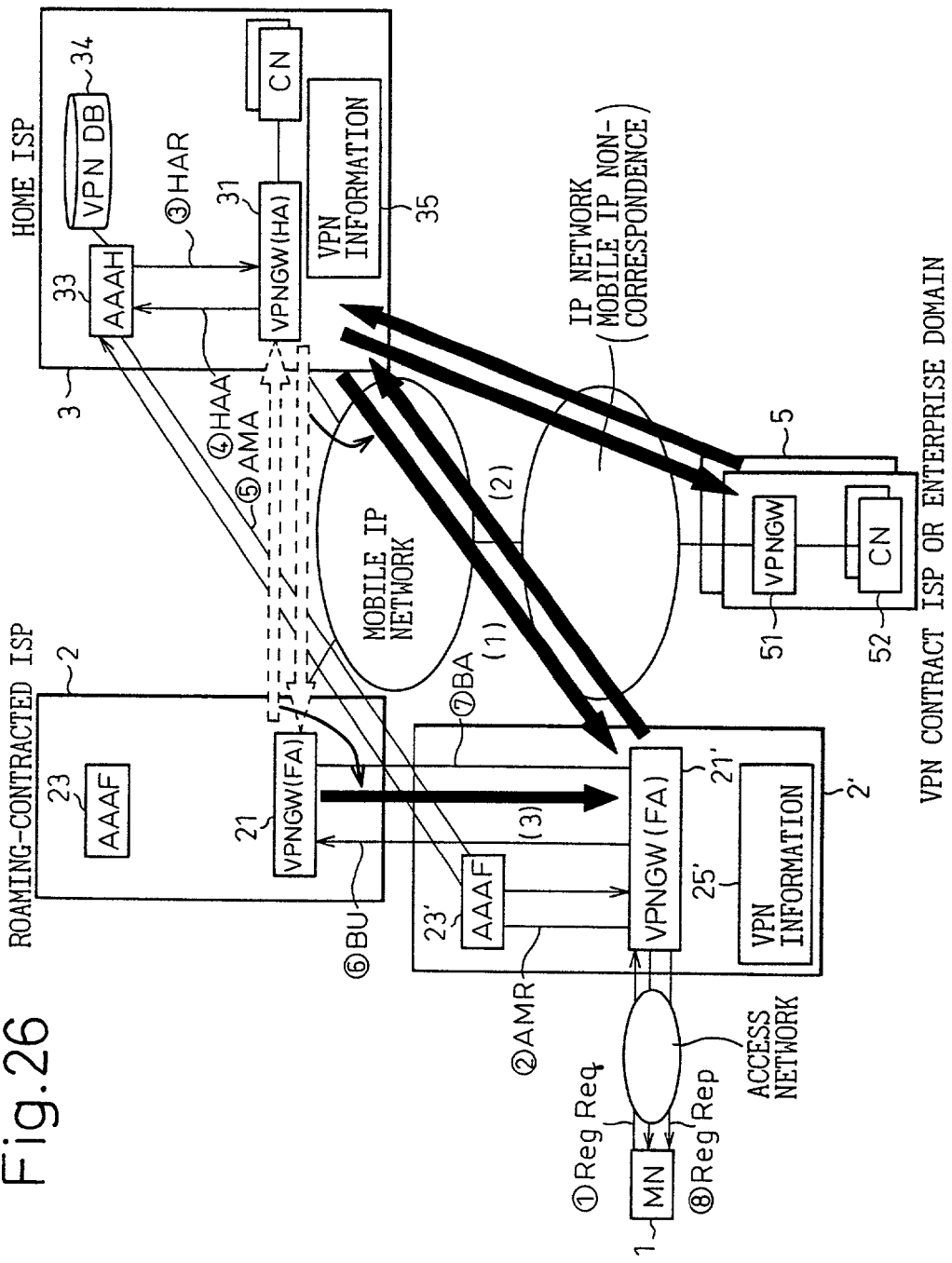
FIG. 26 is a diagram showing a third embodiment.

FIG. 26 shows a third embodiment of the present invention.

This shows an example of a setting of a VPN (when a VPN exists between a stationary HA and a CN) at the time of a move between different domains. This schematically shows how a VPN is reconstructed when the MN 1 of a user has moved from the FA 21 of the roaming-contracted ISP 2 of the first embodiment to other FA 21' of a different roaming-contracted ISP 2' after a VPN has been set from the FA 21 to the GW 51 of the enterprise domain.

In FIG. 26, when the MN 1 of the user has moved between different domains 2 and 2', the user transmits a registration request (Reg Req) in a procedure similar to that of a normal initial position registration as prescribed in the DIAMETER mobile expansion draft (draft-ietf-calhoun-diameter-mobileip-o8) (①). The FA 21' of the move destination includes this registration request into the authentication request message (AMR) (②), and transmits this authentication request message (AMR) to the AAA (AAAH) 33 of the user home ISP via a local AAA server (AAAF) 22' within the own FA 21'.

As the two VPNs including the VPN between the FA and the HA and the VPN between the HA and the enterprise GW have already been set to the VPN information cache, the AAAH 33 rewrites the address of the FA of the VPN between the FA and the HA to the address of the new FA 21'. Next, the AAAH 33 transmits to this HA 31 a position registration request message (HAR) added with the profiles of the two VPNs (③). The HA 31 updates the cache based on the VPN information added to the position registration request message (HAR), deletes the IP Sec. tunnel directed from the HA 31 to the old FA 21, and sets a new IP Sec. tunnel (1) to the new FA 21'. Then, after finishing the position registration processing, the HA 31 returns the position registration response message (HAA) to the AAAH (④). In this case, the HA 31 returns the address information of the old FA 21 as additional information.

Upon receiving the position registration response message (HAA), the AAAH 33 extracts the VPN between the FA and the HA from the VPN information cache, and transmits to an AAAF 23' an authentication response message (AMA) added with the VPN profile to be set to the FA (⑤). The AAAF 23' caches the VPN information to within the AAAF in order to correspond to the move within the local domain of the MN 1, and transfers this information to the FA 21'. The FA 21' caches the VPN information added to the authentication response message (AMA), maps an assigned differentiated service, and then sets an IP Sec. tunnel (2) from the FA 21' to the HA 31. Further, the FA 21' sets the information for decoding a packet of an opposite-direction tunnel to the IP Sec. information.

Further, when the authentication response message (AMA) includes the old FA address, the FA 21' copies the VPN information cache, and rewrites the transmission originating GW address to the address of the old FA 21 and rewrites the destination GW address to the address of the new FA 21'. Thereafter, the FA 21' adds this VPN information to the BU message, and transmits this message to the old FA 21 (⑥). The old FA 21 caches the VPN information added to the BU message, deletes the IP Sec. tunnel directed from the FA 21 to the HA 31, and maps an assigned differentiated service. Thereafter, the FA 21 sets an IP Sec. tunnel (3) at the hand-off time from this FA 21 to the new FA 21'.

As a result, all the packets addressed to the MN 1 and received by the old FA 21 before the changeover of the IP Sec. tunnel to the new IP Sec. tunnel (1) by the HA 31 are transferred to the new FA 21' via this IP Sec. tunnel (3). The FA 21 returns the BA message to the new FA 21' after completing the setting of the IP Sec. tunnel (3) (⑦). Based on this, the new FA 21' returns the registration response message (Reg Rep) to the MN 1 (⑧).

According to the above-described second and third embodiments, a user who communicates with the enterprise via the ISP can receive the service of a VPN corresponding to a mobile terminal provided by the ISP, without requiring the GW apparatus of the enterprise to have a specific function.

Figure 27:
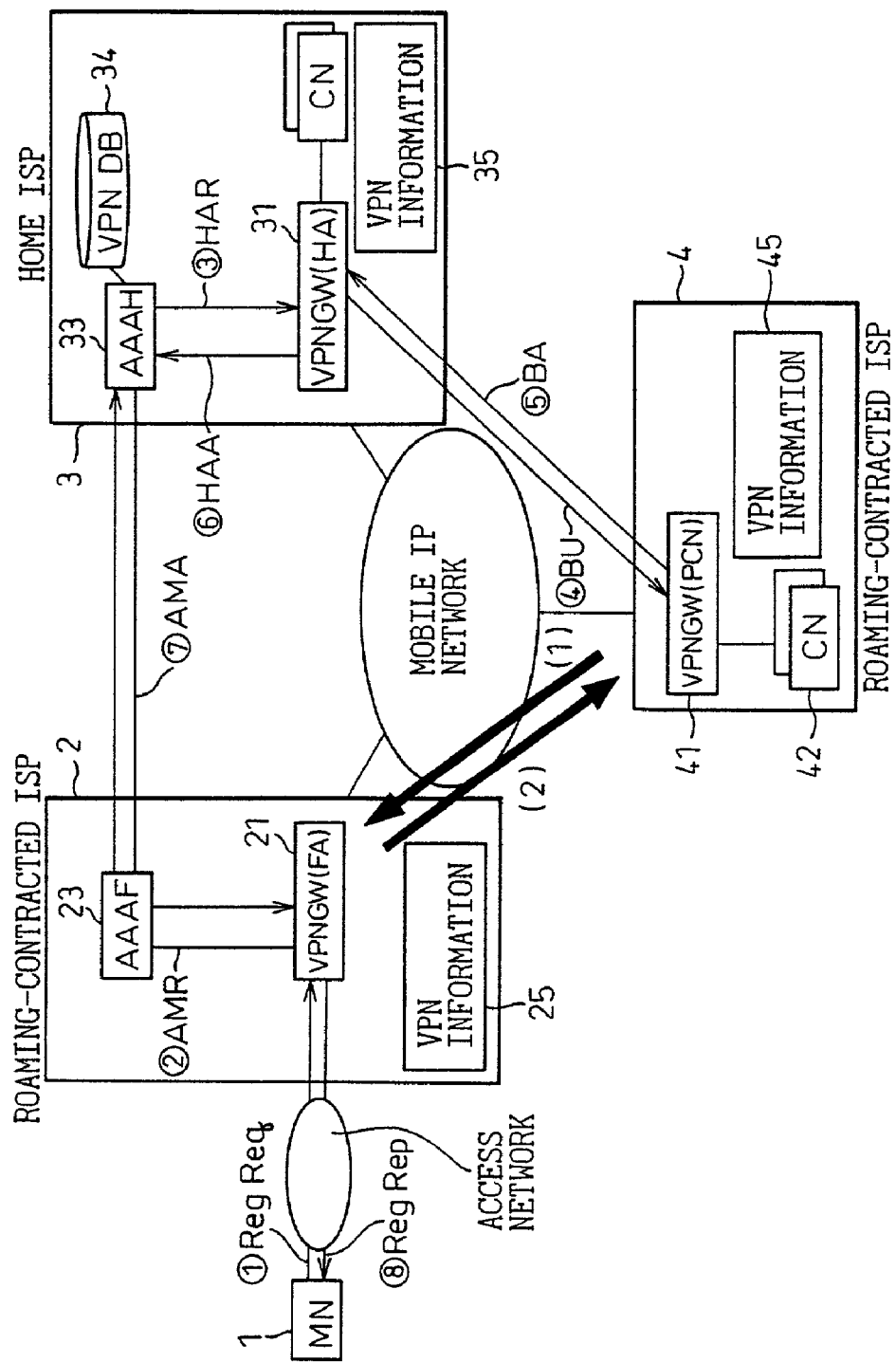
FIG. 27 is a diagram showing a fourth embodiment.

FIG. 27 shows a fourth embodiment of the present invention.

This shows an example of a setting of a VPN (when a PCN exists) at the time of an initial position registration. This schematically shows an example of a setting of a VPN when a roaming-contracted ISP of a communication destination has a VPN and a GW (PCN) to which a VPN can be set dynamically. The ISP that has a VPNGW to which a VPN can be set dynamically registers a domain address of the ISP and a GW apparatus address in the CN-GW correspondence table of each provider at the time of making the roaming contract between ISPs, thereby making it possible to dynamically set a VPN by type of GW.

In FIG. 27, a user joining any one ISP among the roam-contracted ISPs connects to a near access point, and transmits a position registration request (Reg Req) of the mobile IP from this MN 1 (①). The FA21 includes this registration request in an authentication request message (AMR), and transmits this authentication request message to the AAA (AAAH) 33 of the home ISP 3 of the user via the local AAA sever (AAAF) 23 within the own ISP (②).

The AAAH searches the VPN database 34 by the NAI included in the authentication request message (AMR), and extracts the VPN information own to this user. When an address assigned as a user communication destination in the VPN database 34 is within the roaming-contracted ISP 4, it can be known from the CN-GW address correspondence table that it is possible to dynamically set a VPN. Therefore, the AAAH sets a VPN of the GW (PCN) between the FA and the communication ISP 4 to the VPN information cache.

Next, the AAAH transmits a position registration request message (HAR) added with the profile of this VPN, to the HA 31 (③). The HA 31 caches the VPN information added to the position registration request message (HAR). After finishing the position registration processing, the HA 31 can dynamically set a VPN by referring to a type of the GW of the communication destination GW 41 set to the VPN information. Therefore, the HA 31 transmits an MIP Binding update message BU added with this VPN information addressed to a communication terminal CN 42 (④).

A PCN 41 receives the BU transmitted to the CN 42 on behalf of the CN 42, and caches the VPN information added to the BU. Th PCN 41 maps a differentiated service according to the posted VPN information, and sets an IP Sec. tunnel (1) from the PCN 41 to the FA 21. Thereafter, the PCN 41 transmits an MIP Binding Acknowledge message BA to the HA 31 (⑤). When the HA 31 has received the BA, the HA 31 returns the position registration response message (HAA) to the AAAH 33 (⑥). Upon receiving the position registration response message (HAA), the AAAH 33 extracts a VPN of the GW (PCN) between the FA and the communication destination ISP 4 from the VPN information cache. The AAAH 33 then transmits to the AAAF 23 an authentication response message (AMA) added with the VPN profile to be set to the FA 21 (⑦). The AAAF 23 caches the VPN information within the AAAF 23 to follow the move within the local domain of the MN 1, and transfers this VPN information to the FA 21.

The FA 21 caches the VPN information added to the authentication response message (AMA), and further maps an assigned differentiated service. Thereafter, the FA 21 sets an IP Sec. tunnel (2) from the FA 21 to the PCN 41. Further, the FA 21 sets the information for decoding a packet of an opposite-direction tunnel to the IP Sec. information table. Thereafter, the FA 21 returns the registration response message (Reg Rep) to the MN (⑧). As a result, the user can carry out a VPN communication with an optional communication destination within the roaming-contracted ISP group.

Figure 28:
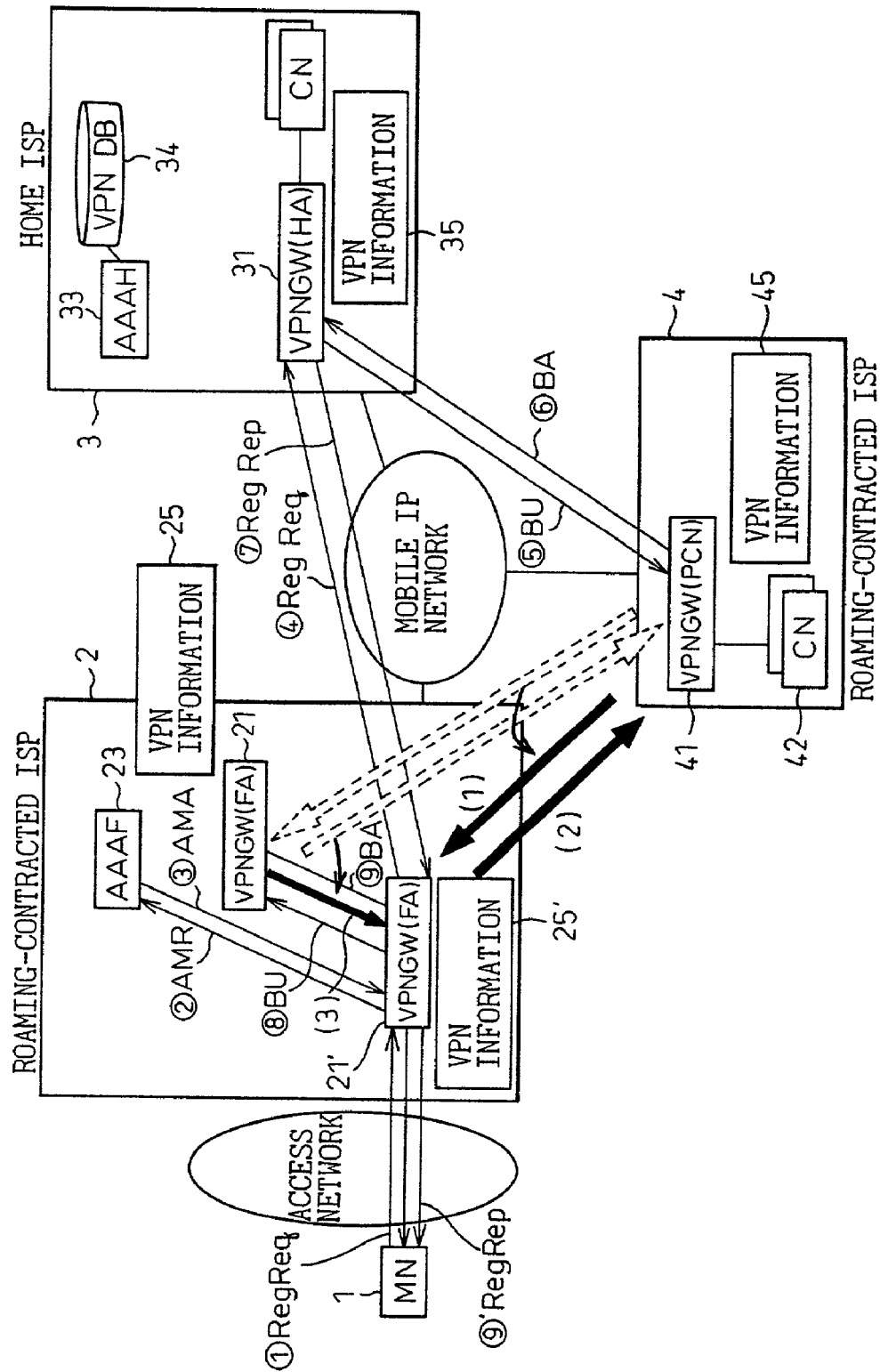
FIG. 28 is a diagram showing a fifth embodiment.

FIG. 28 shows a fifth embodiment of the present invention.

This shows an example of a setting of a VPN (when a PCN exists) at the time of a move within the same domain. This schematically shows how a VPN is reconstructed when the MN 1 of a user has moved from the FA 21 of the roaming-contracted ISP 2 of the fourth embodiment to other FA 21' of the same roaming-contracted ISP 2 after a VPN has been set from this FA 21 to a PCN 41 of other optional roaming-contracted ISP 4.

In FIG. 28, when the MN 1 of the user has moved from the FA 21 to the FA 21' within the same domain, a registration request message (Reg Req) that includes the address of the old FA 21 is transmitted as prescribed in the mobile IP path optimization draft (draft-ietf-mobileip-optim-09) (①). The new FA 21' includes this registration request into an authentication request message (AMR), and transmits this authentication request message (AMR) to the local AAA server (AAAF) 23 within its own ISP 2 (②). When the authentication request message (AMR) includes the old FA 21, the AAAF 23 extracts the VPN between the FA and the PCN from the VPN information cache, and substitutes the address of the FA 21 with the address of the new FA 21'. Then, the AAAF 23 returns to the new FA 21' an authentication response message (AMA) that is added with a profile of the VPN to be set to the FA (③).

The FA 21' transfers the registration request message (Reg Req) previously received from the MN 1 to the HA 31 (④).

The HA 31 specifies a VPN profile of the VPN utilized by this MN 1 from the VPN information cache, and rewrites the address of the FA to the address of the new FA 21'. In the present embodiment, the VPN has already been directly set to between the FA 21 and the PCN 41. Therefore, the HA 31 posts this effect to the PCN 41 by the BU message (⑤). Whether the BU message is to be transmitted or not is determined based on whether the type of the communication destination GW of the VPN information cache is the one to which a VPN can be set dynamically or not.

Next, the PCN 41 deletes the IP Sec. tunnel to the old FA 21 based on the reception of the BU, and sets a new IP Sec. tunnel (1) to the new FA 21'. Thereafter, the PCN 41 transmits the BA message to the HA 31 (⑥). Based on the reception of the BA message, the HA 31 transmits the registration response message (Reg Rep) to the new FA 21' (⑦). The new FA 21' maps an assigned differentiated service by referring to the VPN information cache, and then sets an IP Sec. tunnel (2) from the new FA 21' to the PCN 41. The FA 21' then sets the information for decoding a packet of an opposite-direction tunnel to the IP Sec. information table. Further, the FA 21' copies the VPN information cache, and rewrites the transmission originating GW address to the address of the old FA 21 and rewrites the destination GW address to the address of the new FA 21'. Thereafter, the FA 21' adds this VPN information to the BU message, and transmits this message to the old FA 21 (⑧).

The old FA 21 caches the VPN information added to the BU message, deletes the IP Sec. tunnel directed from the old FA 21 to the PCN 41, and maps an assigned differentiated service. Thereafter, the FA 21 sets an IP Sec. tunnel (3) at the smooth-hand-off time from the old FA 21 to the new FA 21'. As a result, all the packets addressed to the MN 1 from the PCN 41 and received by the FA 21 before the changeover of the IP Sec. tunnel to the new IP Sec. tunnel (1) are transferred to the new FA 21' via this IP Sec. tunnel (3). The old FA 21 returns the BA message to the MN after completing the setting of the IP Sec. tunnel (3) (⑨). Based on this, the new FA 21' returns the registration response message (Reg Rep) to the MN 1 (⑨).

Figure 29:
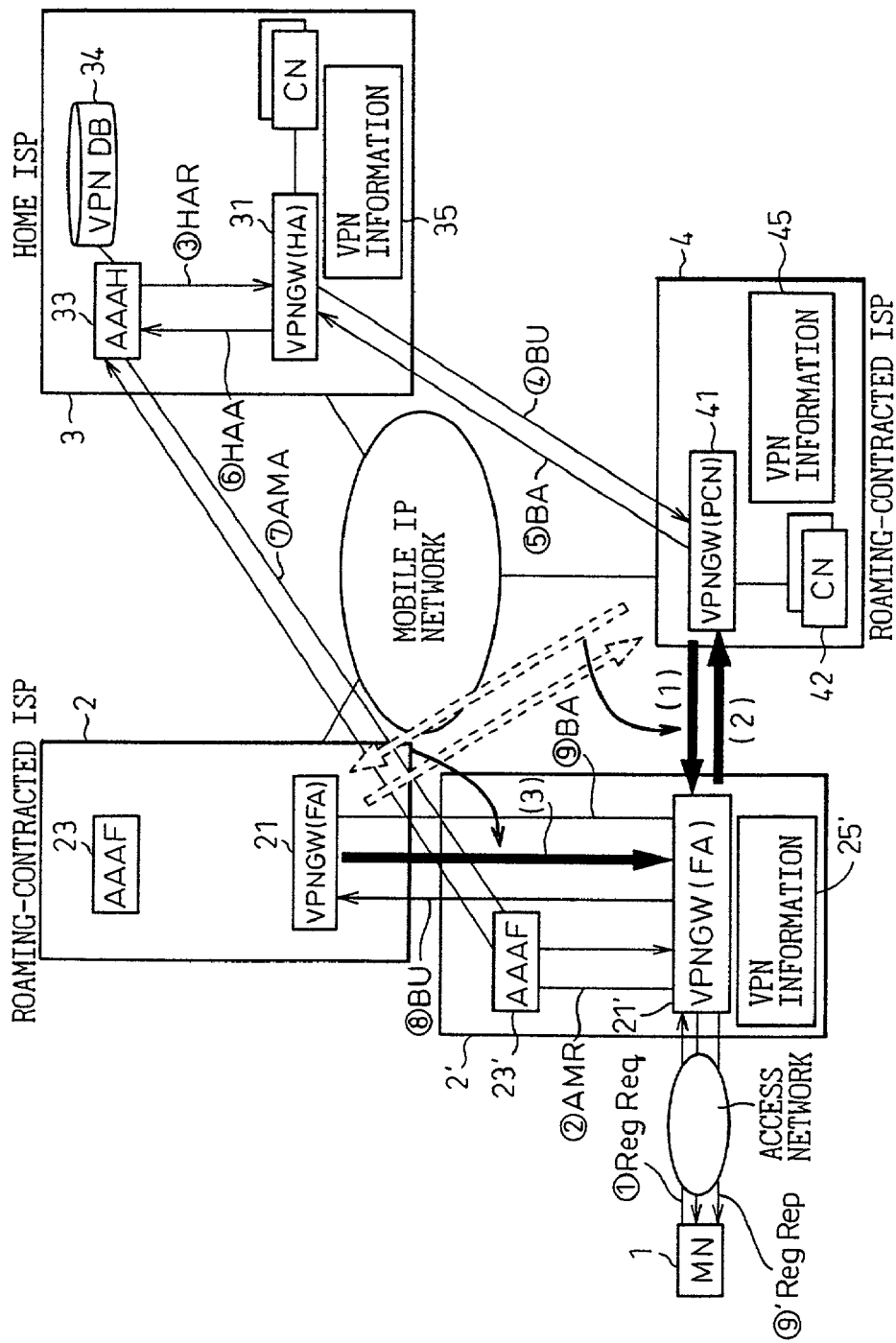
FIG. 29 is a diagram showing a sixth embodiment.

FIG. 29 shows a sixth embodiment of the present invention.

This shows an example of a setting of a VPN (when a PCN exists) at the time of a move between different management domains. This schematically shows how a VPN is reconstructed when the MN 1 of a user has moved from the FA 21 of the roaming-contracted ISP 2 of the fourth embodiment to other FA 21' of a different roaming-contracted ISP 2' after a VPN has been set from this FA 21 to a PCN 41 of other optional roaming-contracted ISP 4.

In FIG. 29, when the MN 1 of the user has moved between different domains 2 and 2', the user transmits a registration request message (Reg Req) in a procedure similar to that of a normal initial position registration as prescribed in the DIAMETER mobile expansion draft (draft-ietf-calhoun-diameter-mobileip-o8) (①). The FA 21' of the move destination includes this registration request message into the authentication request message (AMR), and transmits this authentication request message (AMR) to the AAA (AAAH) 33 of the user home ISP via a local AAA server (AAAF) 23' within the own ISP (②). As the VPN between the FA21 and the PCN 41 has already been set to the VPN information cache, the AAAH 33 rewrites the address of this FA 21 to the address of the new FA 21'. Next, the AAAH 33 transmits to this HA 31 a position registration request message (HAR) added with the profiles of this VPN (③).

The HA 31 updates the cache based on the VPN information added to the position registration request message (HAR), and transmits the BU message to the PCN 41 (④). Upon receiving the BU message, the PCN 41 deletes the IP Sec. tunnel to the old FA 21, and sets a new IP Sec. tunnel (1) to the new FA 21'. Thereafter, the PCN 41 transmits the BA message to the HA 31 (⑤). Upon receiving the BA message, the HA 31 returns the position registration response message (HAA) to the AAAH 33 (⑥). In this case, the HA 31 returns the address information of the old FA 21 as additional information.

Upon receiving the position registration response message (HAA), the AAAH 33 extracts the VPN between the FA and the HA from the VPN information cache, and transmits to an AAAF 23' an authentication response message (AMA) added with the VPN profile to be set to the FA (⑦). The AAAF 23' caches the VPN information within the AAAF in order to correspond to the move within the local domain of the MN 1, and transfers this information to the new FA 21'. The new FA 21' caches the VPN information added to the authentication response message (AMA), maps an assigned differentiated service, and then sets an IP Sec. tunnel (2) from the FA 21' to the PCN 41. Further, the FA 21' sets the information for decoding a packet of an opposite-direction tunnel to the IP Sec. information.

When the authentication response message (AMA) includes the address of the old FA 21 like this case, the FA 21' copies the VPN information cache, and rewrites the transmission originating GW address to the address of the old FA 21 and rewrites the destination GW address to the address of the new FA 21'. Thereafter, the FA 21' adds this VPN information to the BU message, and transmits this message to the old FA 21 (⑧). The old FA 21 caches the VPN information added to the BU message, deletes the IP Sec. tunnel directed from the old FA 21 to the PCN 41, and maps an assigned differentiated service. Thereafter, the FA 21 sets an IP Sec. tunnel (3) at the smooth-hand-off time from this FA 21 to the new FA 21'.

As a result, all the packets addressed to the MN 1 from the PCN 41 and received by the old FA 21 before the changeover of the IP Sec. tunnel are transferred to the new FA 21' via this IP Sec. tunnel (3). The old FA 21 returns the BA message to the MN after completing the setting of the IP Sec. tunnel (3) (⑨). Based on this, the new FA 21' returns the registration response message (Reg Rep) to the MN 1 (⑨'). As shown in the fifth and sixth embodiments, according to the present invention, a user who is a member of the roaming-contract ISP group can set a VPN with any optional communication destination within this group. Further, this user can move freely within this group with the VPN unchanged.

Figure 30:
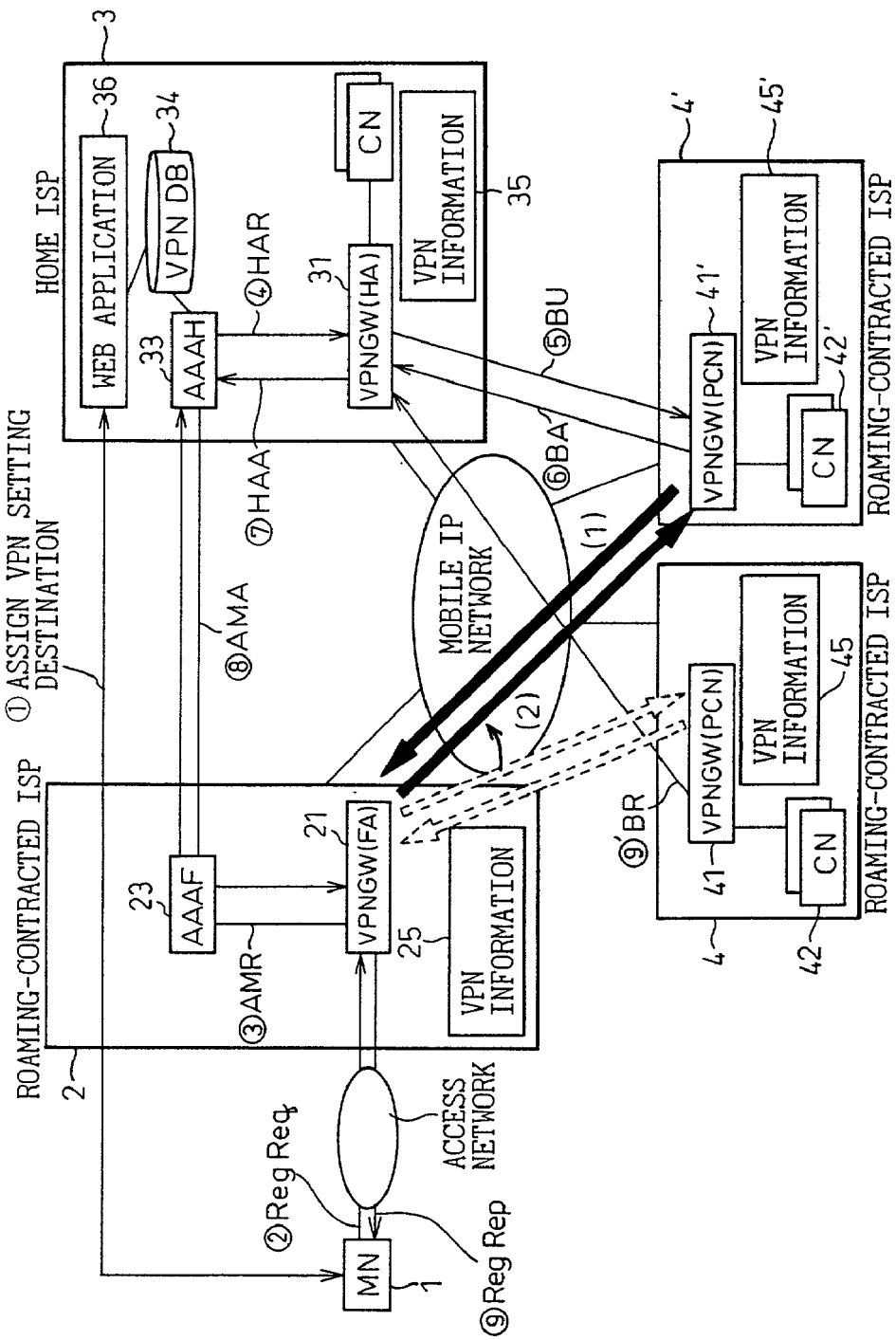
FIG. 30 is a diagram showing a seventh embodiment.

FIG. 30 shows a seventh embodiment of the present invention.

This shows an example of a setting of a VPN between optional terminals assigned by the user. While the above-explained examples are for setting a VPN to a specific communication destination assigned by the user, it is also possible for the user to dynamically set a VPN to a communication destination. The present embodiment shows an example of case where the user sets a VPN to a communication destination other than the communication destination that has been assigned by the user when the contract was made.

A user who wants a change of a VPN setting destination makes access to a home page of a VPN service customize provided by a home ISP 3 of the user. The user sets an address of a communication destination through this home page. A WEB application 36 linked with this home page changes the VPN information of the user in a VPN database 34 to the information assigned by the user (①). When the customizing has been finished, the MN 1 of the user transmits a position registration request message (Reg Req) added with a service update request to an FA 21 to which the user is currently connected (②). Upon receiving the registration request added with the service update request, the FA 21 includes this registration request into an authentication request message (AMR), and transmits this authentication request message (AMR) to an AAA (AAAH) 33 of the user home ISP via a local AAA server (AAAF) 23 within the own ISP (③).

The AAAH 33 receives the message added with the service update request regardless of whether the VPN information cache already exists or not, and searches a VPN database 34 with an NAI included in the authentication request message (AMR), and extracts the VPN information to this user. When the address assigned as the user communication destination in the VPN database 34 is within the roaming-contracted ISP, it can be known from a CN-GW address correspondence table that a VPN can be dynamically set to this communication destination. Therefore, according to the present embodiment, the AAAH 33 sets a VPN for a GW (PCN) 41' between the FA 21 and the communication destination ISP in the VPN information cache. Then, the AAAH 33 transmits to the HA 31 a position registration request message (HAR) added with the profile of this VPN (④).

The HA 31 caches the VPN information added to the position registration request message (HAR). After finishing the position registration processing, the HA 31 can dynamically set a VPN by referring to a type of the GW of the communication destination GW 41' set to the VPN information. Therefore, the HA 31 transmits an MIP Binding update message BU added with this VPN information addressed to a communication terminal CN 42' (⑤).

The PCN 41' receives the BU transmitted to the CN 42' on behalf of the CN 42', and caches the VPN information added to the BU message. Th PCN 41' maps a differentiated service according to the posted VPN information, and sets an IP Sec. tunnel (1) from the PCN 41' to the FA 21. Thereafter, the PCN 41' transmits an MIP Binding Acknowledge message BA to the HA 31 (⑥).

When the HA 31 has received the BA message, the HA 31 returns the position registration response message (HAA) to the AAAH 33 (⑦). Upon receiving the position registration response message (HAA), the AAAH 33 extracts a VPN of the GW (PCN) 41' between the FA 21 and the communication destination ISP from the VPN information cache. The AAAH 33 then transmits to the AAAF 23 an authentication response message (AMA) added with the VPN profile to be set to the FA 21 (⑧). The AAAF 23 caches the VPN information to within the AAAF 23 to follow the move within the local domain of the MN 1, and transfers this VPN information to the FA 21.

The FA 21 caches the VPN information added to the authentication response message (AMA), and further maps an assigned differentiated service. Thereafter, the FA 21 sets an IP Sec. tunnel (2) from the FA 21 to the PCN 41'. Further, the FA 21 sets the information for decoding a packet of an opposite-direction tunnel to the IP Sec. information table. Thereafter, the FA 21 returns the registration response message (Reg Rep) to the MN (⑨). When a VPN that has been set before the change of the VPN exists, the PCN 41 transmits a Binding request message BR to the HA 31 that has posted this VPN information and asks whether the VPN can be deleted or not, when the remaining lifetime has become less than a threshold value (⑨).

Upon receiving this BR message, the HA 31 searches a VPN information cache from the information of the MN 1 that has been set to this message, and checks whether the VPN relating to this PCN 41 still exists in the cache. When this VPN has still been cached, the HA 31 transmits a BU message to the PCN 41. When the VPN has not been cached, the HA 31 transmits no BU message to the PCN 41. In the present example, the PCN 41 deletes an existing VPN as no BU can be received until the completion of the lifetime. As explained above, the user can also dynamically assign a VPN setting destination. In the present embodiment, an example of assigning a VPN setting destination only through the WEB has been shown. However, the gist of the present invention is the distribution of the VPN information to an assigned setting destination and the setting/releasing means of this VPN information under a mobile environment. There are various methods of assigning a communication destination and means for reflecting them to the VPN database 34. For example, there are various applications such as a dialing of a VPN code with a communication destination using a portable telephone, and a one-click setting of a VPN from a communication server, etc.

As explained above, the present invention has the following effects.

1) It is possible to provide a VPN setting service to between optional terminals without requiring an MN and a CN to have a specific VPN function. This is achieved by dynamically setting a VPN of the IP Sec. to a security gateway of terminals participating in communications, to a public IP network, linked with a position registration procedure in the mobile IP.

2) It is possible to set a VPN with the service quality, the security level, and the route, assigned by users based on a free combination.

3) It is possible to automatically update a VPN path along with a move of an MN.

What is claimed is:

1. A server apparatus provided in a home network of an IP network using a protocol that automates the management of an IP address and the transfer of a communication packet to a move destination when a mobile terminal has moved between different IP network, the server apparatus comprising:

memory means that stores VPN information for constructing a safe communication path within an IP network in relation to the terminal, the VPN information containing VPN path distribution means that distributes the VPN information to a first network apparatus, a second network apparatus, and a third network apparatus at the time of transmitting an authentication response message to a position registration request message from the terminal, the first network apparatus having a security gateway function of the home network, the second network apparatus a security gateway function of the external network of a move destination, the third network apparatus having a security gateway function of a predetermined network in which a correspondent node CN with whom the terminal communicates exists, wherein the respective network apparatuses set a VPN path by the IP Sec. based on the distributed VPN information, to between the first network apparatus and the second network apparatus, between the first network apparatus and the third network apparatus, and/or between the second network apparatus and the third network apparatus respectively.

2. The server apparatus according to claim 1, wherein the distribution means distributes the VPN information after receiving a communication packet from the correspondent node (CN) that becomes the communication destination.

3. A VPN system in a mobile IP network, the VPN system comprising:

a mobile terminal;

a home authentication server provided in a home network of a user and an external authentication server provided in other external network;

a VPN database provided in the home network, the VPN database containing VPN information having VPN path setting information and security information of a virtual private network;

a first network apparatus having a security gateway function of the home network;

a second network apparatus having a security gateway function of the other external network;

a third network apparatus having a security gateway function of a predetermined network in which a correspondent node CN with whom the terminal communicates exists, wherein the home authentication server extracts from the VPN database the VPN information of a user who has requested an authentication at the time of a position registration request from a mobile terminal, and posts this VPN information to each network apparatus by using a predetermined position registration message and an authentication response message, and the respective network apparatuses set a VPN path by the IP Sec. based on posted VPN information, to between the first network apparatus and the second network apparatus, between the first network apparatus and the third network apparatus, and/or between the second network apparatus and the third network apparatus respectively.

4. The VPN system according to claim 3, wherein the authentication sever and the network apparatus update VPN information cached in the authentication server and the network apparatus to new path information or rewrite the VPN information with position information linked with a position registration request based on a move of a mobile terminal, thereby to automatically update each VPN path between the home network apparatus and the external network apparatus, between the home network apparatus and the predetermined network apparatus, and/or between the external network apparatus and the predetermined network apparatus, to a new VPN path based on the IP Sec. respectively.

5. The VPN system according to claim 3, wherein each network apparatus includes:

an MA protocol processing section that controls protocols relating to a service profile in which the VPN information has been set by caching; and an MAVPN control section that sets a QoS control for guaranteeing the service quality and a tunnel for guaranteeing the security between the security gateways according to the service profile.

6. A VPN system in a mobile IP network, the VPN system comprising:
- a mobile terminal;
- a home authentication server provided in a home network of a user and an external authentication server provided in other external network;
- a VPN database provided in the home network; and
- network apparatuses that have gateway functions of a home network, an external network, a predetermined communication host and/or an agent server therefor; wherein the home authentication server includes:
- an AAAVPN control section hat specifies a VPN set path from the information of the external network apparatus connected by the mobile terminal set in a predetermined authentication request message and the information of the home network apparatus of the mobile terminal, by using a correspondence table showing a correspondence between the VPN information of the VPN database and a predetermined network apparatus accommodating a communication host held by itself; and
- an AAA protocol processing apparatus that sets a service quality between the network apparatuses and security information to a predetermined authentication response message to an access network and to a position registration message to the home network, as service profiles, wherein the home authentication server extracts form a VPN database VPN information of a user who has requested an authentication at the time of a position registration request from a mobile terminal, and posts this VPN information to each network apparatus by using a predetermined position registration message and an authentication response message, and wherein the respective network apparatuses set a VPN path by the IP Sec. based on posted VPN information, to between the home network apparatus and the external network apparatus, between the home network apparatus and the predetermined network apparatus, and/or between the external network apparatus and the predetermined network apparatus respectively.

7. An external authentication server existing with a mobile terminal in an IP network using a protocol that automates the management of an IP address and the transfer of a communication packet to a move destination when the terminal has moved between different IP networks, the external authentication server comprising:
- means that extracts VPN path information corresponding to a user included in an authentication response message from a home authentication server when the mobile terminal has made a position registration request; and
- VPN path construction instruction means that instructs a network apparatus accommodating the mobile terminal to construct a VPN path between this apparatus and a network apparatus having a security gateway function of a home network, and a VPN path between this network apparatus and a network apparatus accommodating a correspondent node CN as a communication destination, based on the extracted VPN path information.

8. The external authentication server according to claim 7, wherein
the safe communication path is a communication path realized by a virtual private network, and the safety path information includes set path information and security information of the virtual private network.

9. The external authentication server according to claim 8, wherein
the safe communication path is a VPN path according to the IP Sec.

10. A network apparatus for accommodating a mobile terminal in an IP network using a protocol that automates the management of an IP address and the transfer of a communication packet to a move destination when a terminal has moved between different IP networks, the network apparatus comprising:
- means that receives a VPN path construction instruction based on VPN path information corresponding to a user included in an authentication response message from a home authentication server when the mobile terminal has made a position registration request; and
- VPN path construction means that constructs a VPN path between this apparatus and a network apparatus having a security gateway function of a home network, and a VPN path between this network apparatus and a network apparatus accommodating a correspondent node CN as a communication destination, based on the received VPN path construction information.

11. The network apparatus according to claim 10, wherein
the safe communication path is a communication path realized by a virtual private network, and the safety path information includes set path information and security information of the virtual private network.

12. The network apparatus according to claim 11, wherein
the safe communication path is a VPN path according to the IP Sec.

13. A VPN setting method in a mobile IP network comprising the steps:
- that a user network apparatus sets VPN path by a stationary IP Sec. tunnel directed from the user network apparatus to its home agent;
- that a user mobile terminal transmits a position registration request message to a foreign agent;
- that the foreign agent transmits an authentication request message including the received position registration request information to a user home authentication server via a local authentication server of the foreign agent;
- that, based on the received authentication request message, the home authentication server refers to its own database and extracts a communication destination host, a type of the network apparatus, and security service information by users, caches the extracted information as VPN information between the foreign agent and the home agent and between the user network apparatus and the home agent, and transmits the position registration request message including this information to the home agent;
- that the home agent caches the received position registration request message, sets the assigned security service, sets a VPN path by an IP Sec. tunnel directed from the home agent to the user network apparatus as a communication destination host and to the foreign agent respectively, and transmits a position registration response message to the home authentication server after finishing the position registration processing;
- that, based on the reception of the position registration response message, the home authentication server transmits the authentication response message added with the cached VPN information between the foreign agent and the home agent, to a local authentication server of the foreign agent;

that the local authentication server transmits the received authentication response message to the foreign agent after caching the VPN information between the home agent and the foreign agent; and that the foreign agent caches the VPN information included in the received authentication response message, sets the assigned security service, sets a VPN path by an IP Sec. tunnel directed from the foreign agent to the home agent, and then returns the position registration response message to the user mobile terminal.

14. The VPN setting method according to claim 13, further comprising the steps:

that the user mobile terminal moves to an area of a new foreign agent within the same network, and transmits from there a position registration request message including position information of the old foreign agent;

that the new foreign agent transmits an authentication request message including the received position registration request information to the local authentication server;

that the local authentication server rewrites the foreign agent information of the cached VPN information between the foreign agent and the home agent to the information of the new foreign agent, and transmits an authentication response message including this information to the new foreign agent;

that the new foreign agent transfers the received position registration request message to the home agent;

that, based on the received position registration request information, the home agent rewrites the foreign agent information of the cached VPN information between the foreign agent and the home agent to the information of the new foreign agent, deletes the VPN path directed from the home agent to the old foreign agent, sets a VPN path by an IP Sec. tunnel directed from the home agent set with the assigned security service to the new foreign agent, and transmits a position registration response message to the new foreign agent after finishing the position registration processing; and that the new foreign agent caches the VPN information included in the received position registration response message, sets the assigned security service, sets a VPN path by an IP Sec. tunnel directed from the new foreign agent to the home agent, and then returns the position registration response message to the user mobile terminal.

15. The VPN setting method according to claim 13, further comprising the steps:

that the user mobile terminal moves to an area of a new foreign agent within a different network, and transmits from there a position registration request message including position information of the old foreign agent;

that the new foreign agent transmits an authentication request message including the received position registration request information to the home authentication server of the user via a local authentication server of the new foreign agent;

that the home authentication server rewrites the foreign agent information of the cached VPN information between the foreign agent and the home agent to the information of the new foreign agent, and transmits the position registration request message including this information to the home agent;

that, based on the received position registration request information, the home agent updates the cached VPN information, deletes the VPN path directed from the home agent to the old foreign agent, sets a VPN path by an IP Sec. tunnel directed from the home agent set with the assigned security service to the new foreign agent, and transmits a position registration response message to the home authentication server after finishing the position registration processing;

that, based on the reception of the position registration response message, the home authentication server transmits the authentication response message added with the cached VPN information between the foreign agent and the home agent, to a local authentication server of the new foreign agent;

that the local authentication server transmits the received authentication response message to the new foreign agent after updating the cached VPN information; and that the new foreign agent caches the VPN information included in the received authentication response message, sets the assigned security service, sets a VPN path by an IP Sec. tunnel directed from the new foreign agent to the home agent, and then returns the position registration response message to the user mobile terminal.

16. A VPN setting method in a mobile IP network comprising the steps:

that a user mobile terminal transmits a position registration request message from the user mobile terminal to a foreign agent;

that the foreign agent transmits an authentication request message including the received position registration request information to a user home authentication server via a local authentication server of the foreign agent;

that, based on the received authentication request message, the home authentication server refers to its own database and extracts a communication destination host, a type of the network apparatus, and security service information by users, sets a VPN between the foreign agent and the communication destination network apparatus to a VPN cache when the type of the network apparatus is a one to which a VPN can be set dynamically, and transmits the position registration request message including this information to the home agent;

that the home agent caches the received position registration request message, and transmits a binding update message added with this VPN information to the communication destination host after finishing the position registration processing, when the type of the network apparatus is a one to which a VPN can be set dynamically;

that the network apparatus receives the binding update message on behalf of the communication destination host, caches the VPN information added to this message, sets the assigned security service, sets a VPN path by an IP Sec. tunnel directed from the network apparatus to the foreign agent, and thereafter transmits a binding authorization message to the home agent;

that, upon receiving the binding authorization message, the home agent transmits a position registration response message to the home authentication server;

that, based on the reception of the position registration response message, the home authentication server transmits the authentication response message added with the cached VPN information between the foreign agent and the network apparatus, to a local authentication server of the foreign agent;

that the local authentication server transmits the received authentication response message to the foreign agent after caching the VPN information added to this message; and that the foreign agent caches the VPN information included in the received authentication response message, sets the assigned security service, sets a VPN path by an IP Sec. tunnel directed from the foreign agent to the network apparatus, and then returns the position registration response message to the user mobile terminal.

17. The VPN setting method according to claim 16, further comprising the steps:

that the user mobile terminal moves to an area of a new foreign agent within the same network, and transmits from there a position registration request message including position information of the old foreign agent;

that the new foreign agent transmits an authentication request message including the received position registration request information to the local authentication server;

that the local authentication server rewrites the foreign agent information of the cached VPN information between the foreign agent and the network apparatus to the information of the new foreign agent, and transmits an authentication response message including this information to the new foreign agent;

that the new foreign agent transfers the received position registration request message to the home agent;

that, based on the received position registration request information, the home agent rewrites the foreign agent information of the cached VPN information between the foreign agent and the network apparatus to the information of the new foreign agent, and transmits a binding update message added with this VPN information to the communication destination host, when the type of the network apparatus is a one to which a VPN can be set dynamically;

that, based on the received binding update message, the network apparatus updates the cached VPN information, deletes the VPN path directed from the network apparatus to the old foreign agent, sets a VPN path by an IP Sec. tunnel directed from the network apparatus set with the assigned security service to the new foreign agent, and thereafter transmits a coupling authorization message to the home agent;

that, upon receiving the binding authorization message, the home agent transmits a position registration response message to the new foreign agent; and that the new foreign agent caches the VPN information included in the received position registration response message, sets the assigned security service, sets a VPN path by an IP Sec. tunnel directed from the new foreign agent to the network apparatus, and then returns the position registration response message to the user mobile terminal.

18. The VPN setting method according to claim 16, further comprising the steps:

that the user mobile terminal moves to an area of a new foreign agent within a different network, and transmits from there a position registration request message including position information of the old foreign agent;

that the new foreign agent transmits an authentication request message including the received position registration request information to the home authentication server of the user via a local authentication server of the new foreign agent;

that the home authentication server rewrites the foreign agent information of the cached VPN information between the foreign agent and the home agent to the information of the new foreign agent, and transmits the position registration request message including this information to the home agent;

that, based on the received position registration request information, the home agent updates the cached VPN information, and transmits a binding update message added with this VPN information to the communication destination host when the type of the network apparatus is a one to which a VPN can be set dynamically;

that, based on the received binding update message, the network apparatus updates the cached VPN information, deletes the VPN path directed from the network apparatus to the old foreign agent, sets a VPN path by an IP Sec. tunnel directed from the network apparatus set with the assigned security service to the new foreign agent, and thereafter transmits a binding authorization message to the home agent;

that, upon receiving the binding authorization message, the home agent transmits a position registration response message to the new foreign agent;

that, based on the reception of the position registration response message, the home authentication server transmits the authentication response message added with the cached VPN information between the foreign agent and the network apparatus, to a local authentication server of the new foreign agent;

that the local authentication server transmits the received authentication response message to the new foreign agent after caching the VPN information added to this message; and that the new foreign agent caches the VPN information included in the received position registration response message, sets the assigned security service, sets a VPN path by an IP Sec. tunnel directed from the new foreign agent to the network apparatus, and then returns the position registration response message to the user mobile terminal.

19. The VPN setting method according to claim 16, further comprising the steps:

that the user customizes the user VPN information by making access to a database of the home authentication server by predetermined communication means, and thereby changes the communication destination to a network apparatus of the type of the network apparatus to which a VPN can be set dynamically; and the user mobile terminal transmits a position registration request message added with a service update request, to a foreign agent.

20. The VPN setting method according to claim 19, further comprising the steps:

that the network apparatus measures a lifetime of a communication host under its management, transmits a binding request message to the home agent that has posted the VPN information when the remaining lifetime has become less than a predetermined threshold value, and deletes the VPN information when the binding update message has not been received; and the home agent retrieves the cached VPN information from the user mobile terminal information included in the received binding request message, transmits a binding update message when the information of the network apparatus exists, and leaves it as it is when the information of the network apparatus does not exist.

21. The VPN setting method according to claim 14 or 17, further comprising the steps:

that the new foreign agent copies the cached VPN information, and transmits a binding update message added with the VPN information with the transmission origin rewritten to the old foreign agent and with the transmission destination rewritten to the new foreign agent, to the old foreign agent; and that, the old foreign agent caches the VPN information of the received binding update message, deletes the VPN path directed from the old foreign agent to the home agent, sets a VPN path by an IP Sec. tunnel directed from the old foreign agent set with the assigned security service to the new foreign agent, and thereafter transmits a coupling authorization message to the new foreign agent.

22. The VPN setting method according to claim 15 or 18, further comprising the steps:

that the new foreign agent copies the cached VPN information when the authentication response message includes the information of the old foreign agent, and transmits a binding update message added with the VPN information with the transmission origin rewritten to the old foreign agent and with the transmission destination rewritten to the new foreign agent, to the old foreign agent; and that, the old foreign agent caches the VPN information of the received coupling update message, deletes the VPN path directed from the old foreign agent to the home agent, sets a VPN path by an IP Sec. tunnel directed from the old foreign agent set with the assigned security service to the new foreign agent, and thereafter transmits a coupling authorization message to the new foreign agent.

* * * * *